United States Patent [19]

Jones et al.

[11] 3,820,084

[45] June 25, 1974

[54] COMPUTER PROCESSOR REGISTER AND BUS ARRANGEMENT

[75] Inventors: Leo V. Jones, Chicago; Paul J. Keehn, Glen Ellyn; Paul A. Zelinski, Elmhurst, all of Ill.

[73] Assignee: GTE Automatic Electric Laboratories Incorporated, Northlake, Ill.

[22] Filed: Mar. 1, 1973

[21] Appl. No.: 337,041

[52] U.S. Cl. .............................................. 340/172.5

[51] Int. Cl. .............................................. G06f 15/18

[58] Field of Search .................................. 340/172.5

[56] References Cited

UNITED STATES PATENTS

| | | | |
|---|---|---|---|
| 3,377,623 | 4/1968 | Reut et al. | 340/172.5 |
| 3,641,508 | 2/1972 | Saltini | 340/172.5 |
| 3,662,348 | 5/1972 | Weiss | 340/172.5 |
| 3,675,214 | 7/1972 | Ellis et al. | 340/172.5 |
| 3,676,855 | 7/1972 | Tallegas | 340/172.5 |
| 3,699,530 | 10/1972 | Capowski et al. | 340/172.5 |
| 3,710,327 | 1/1973 | Books et al. | 340/172.5 |
| 3,735,365 | 5/1973 | Nakamura et al. | 340/172.5 |

*Primary Examiner*—Raulfe B. Zache
*Assistant Examiner*—Mark Edward Nusbaum
*Attorney, Agent, or Firm*—Bernard E. Franz

[57] ABSTRACT

The computer processor comprises a plurality of registers and an arithmetic logic unit along with interfaces with other units of a data processing system connected as sources and sinks to one data bus and one address bus. Each source for a bus has leads from the output of a register or a set of interface leads connected to inputs of AND function gates with the gates for a selected source enabled by a control signal, and the outputs of the respective bits of the AND gates of the several sources are connected to OR function gates, the outputs of which comprise the bus. A register or set of interface leads acting as a sink has the bus connected to the inputs of AND function gates whose outputs are connected to the inputs of the register or interface leads, and the gates for a sink are enabled by a sink select signal. Each of the buses also has its leads connected back as source leads to AND function gates which are enabled by a LATCH signal, thereby effectively making the bus act as a register. For certain instructions of the order set, either or both buses may be latched during the processing to retain information while the source register is used for other purposes.

7 Claims, 17 Drawing Figures

COMPUTER CENTRAL PROCESSOR CCP

DATA PROCESSOR UNIT DPU

PATENTED JUN 25 1974 3,820,084

SHEET 09 OF 16

PATENTED JUN 25 1974 3,820,084

SHEET 11 OF 16

COMPUTER LINE PROCESSOR INTERFACES

COMPUTER PROCESSOR REGISTER AND BUS ARRANGEMENT

BACKGROUND OF THE INVENTION

1. Field of the Invention

This invention relates to a computer processor register and bus arrangement.

2. Description of the Prior Art

There are many known arrangements for computer processors which comprise several registers and arithmetic logic units which are usually interconnected with each other and interfaces with other units by one or more buses. There may be a trade off between the number of registers provided and the time required to process the individual instructions of the order set.

SUMMARY OF THE INVENTION

The object of this invention is to provide an efficient and effective arrangement of the register and bus structure of a computer processor with respect to the number of registers provided and the time required for processing of instructions.

The invention is incorporated in an arrangement in which a bus has a number of sources from registers and interface leads wherein for each source there is an AND function gate for at least some of the bit positions of the bus, and an enabling signal of the particular source connected as an input to each of the AND function gates to enable them to gate the information via OR function circuits to the respective positions of the bus.

According to the invention one of the sources for a bus is the bus itself having the outputs for each bit position connected back to the input of an AND function gate, these gates having a common input from a latch control signal, so that as long as this signal is enabling the gates the information is latched on the bus. In operation one of the sources is enabled first, then the latching input is provided, and the enabling of the first source may be removed.

In the specific embodiment of the invention there is one data bus and one address bus each of which is provided with the latching feature.

DESCRIPTION OF THE PREFERRED EMBODIMENT

Figure 1:
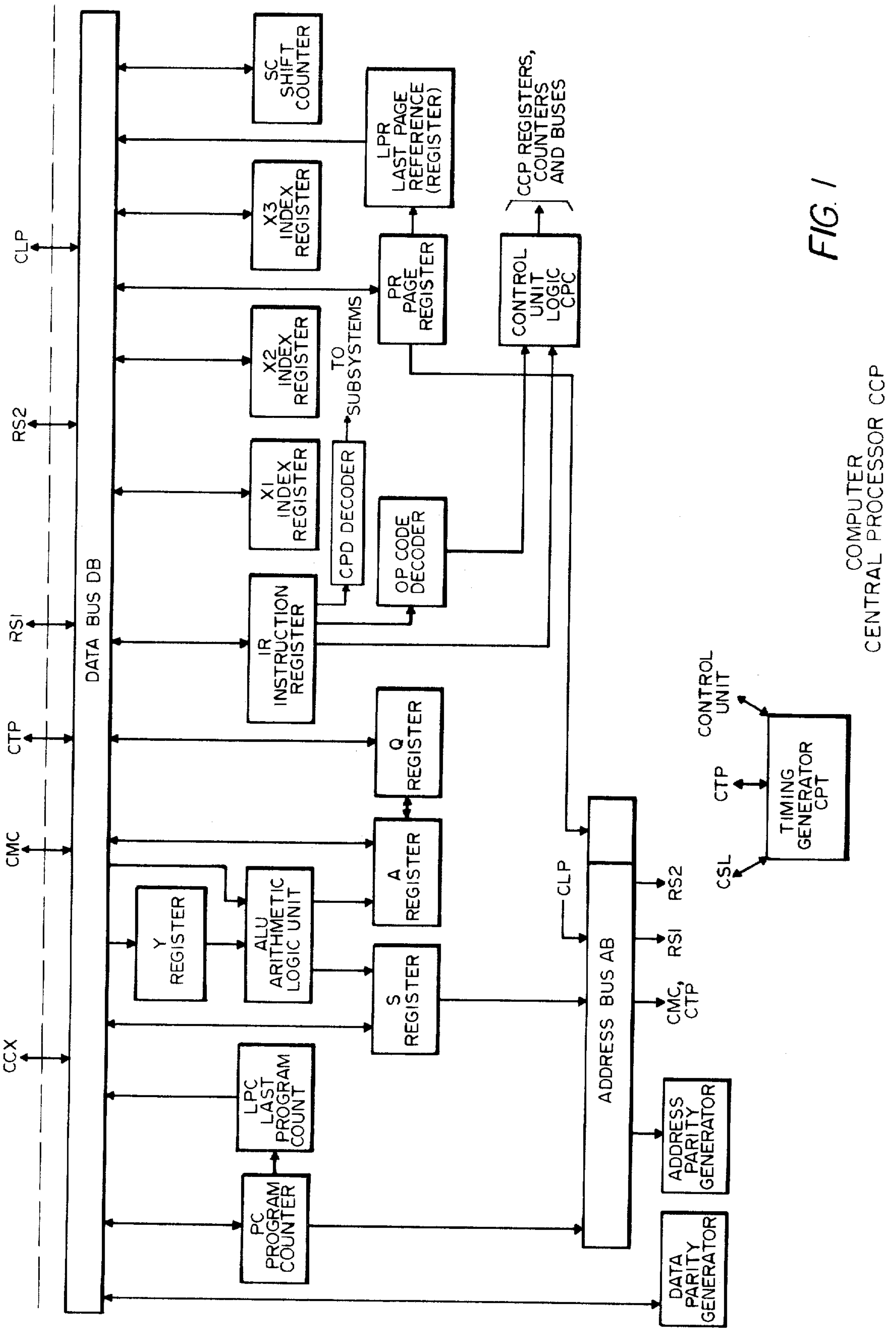
FIG. 1 is a block diagram in a computer central processor showing a data bus and an address bus interconnecting a plurality of registers.

As shown in FIG. 1 a computer central processor CCP comprises a data bus DB, an address bus AB, a plurality of registers, an arithmetic logic unit ALU, control unit logic CPC, and a timing generator CPT.

Figure 2:
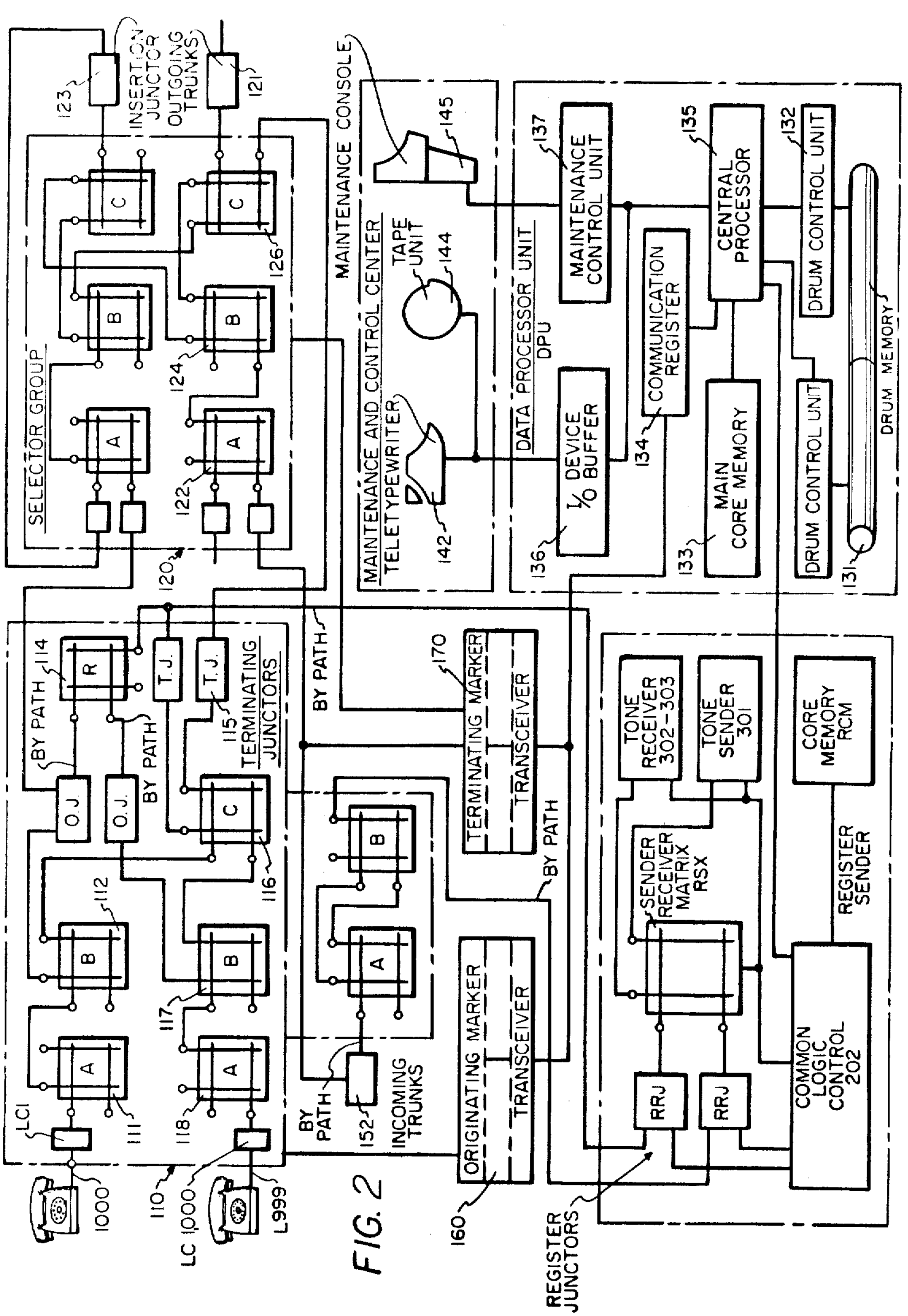
FIG. 2 is a block diagram of a communication switching system in which the computer central processor is a portion of a data processing unit incorporated in the common control of the system.

Referring to FIG. 2, the computer central processor CCP is a portion of the central processor 135, which is part of a data processor unit DPU in the common control of a communication switching system. The common control also includes a register-sender subsystem shown in FIG. 2 as comprising common logic control 202 with a core memory RCM, register junctors RRJ, a sender receiver matrix RSX, tone receivers 302–303 and tone senders 301. A call originated at a local line which comprises the telephone lines connected to line circuits LC1–LC1000 is connected through a line group switching group to a register junctor RRJ. For example, a call originated at line circuit LC1 is connected through an A matrix 111, a B matrix 112, an originating junctor OJ, and an R matrix 114, to one of the register junctors RRJ. The register-sender subsystem returns dial tone via the register junctor, after which the dialed digits in either dial pulse form or tone form are received and processed via the common logic 202 and stored in the core memory RCM. The digits are processed in the register-sender subsystem and the data processor unit subsystem after which a terminating path is completed from the originating junctor through the selector group through the A, B and C stages to a terminating junctor 115 of a line group if it is a local terminating call or to an outgoing trunk 121 if it is an outgoing call to another office. For a local call the route is extended through C, B and A matrices to the called line.

In the data processing unit DPU the central processor 135 operates with a main core memory 133, and also makes use of a drum memory 131 via drum control units 132. A communication register 134 provides for communication of data between the central processor and transceivers in the markers for the switching network. A maintenance control unit 137 connects the central processor 135 to a maintenance console 145; and an input-output device buffer 136 connects the central processor to other devices such as a teletypewriter 142 of tape unit 144 in a maintenance and control center.

Figure 3:
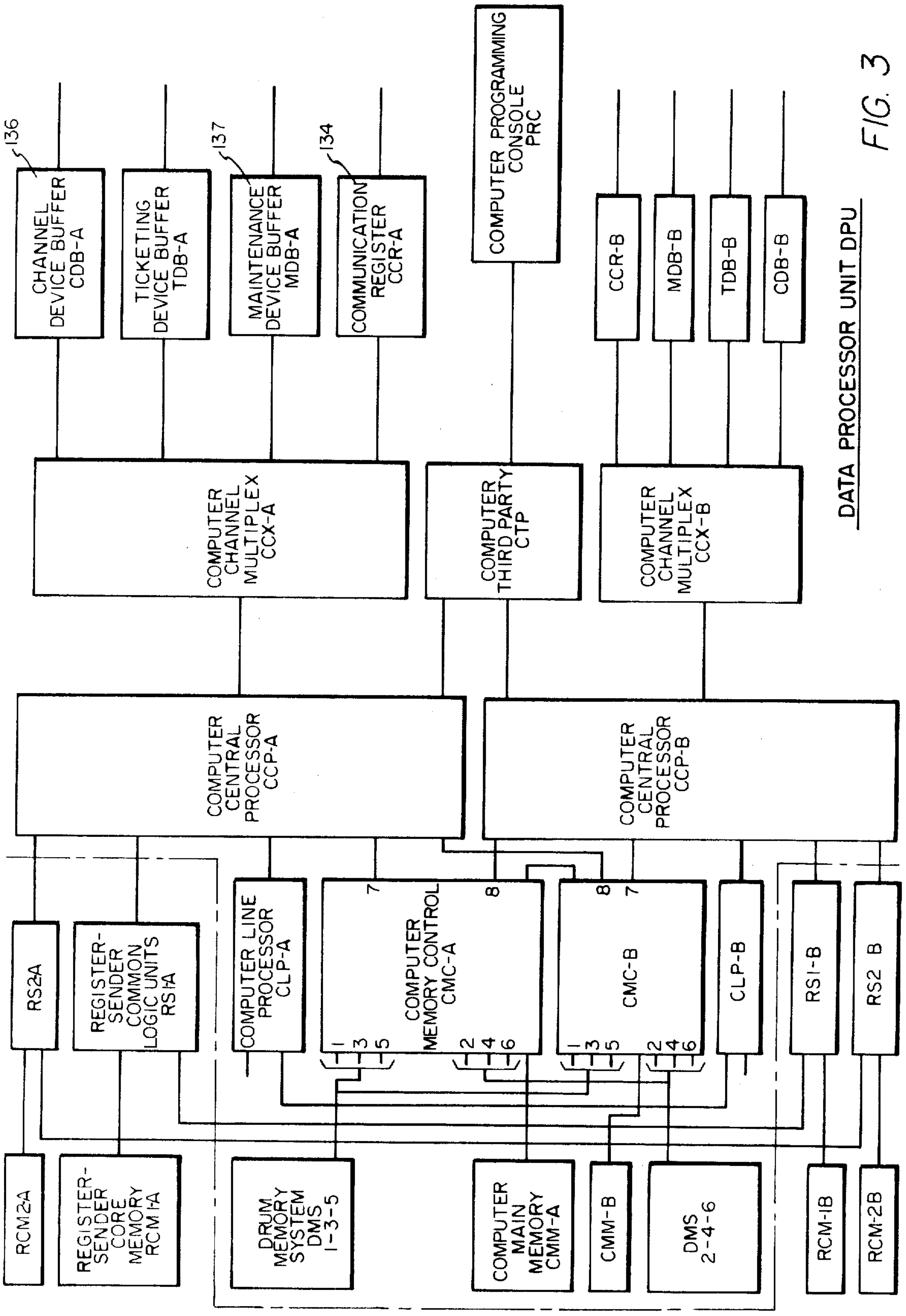
FIG. 3 is a block diagram showing how the computer central processor interfaces with other units of the data processing unit and of a register sender subsystem which together form the common control of the switching system.

The common control apparatus of the switching system is shown in FIG. 3 in a block diagram which shows the duplication of units, and how they interface with the computer central processor CCP. The computer central processor is duplicated comprising units CCP-A and CCP-B. A computer third party CTP provides for maintenance and control functions, including coupling of the processors to a computer programming console PRC. The register-sender subsystem in a maximum configuration comprises two duplicated register-sender units, namely register-sender unit RS1A and its duplicate RS1-B, and unit RS2A and its duplicate RS2B.

The apparatus in FIG. 3 other than the register-sender subsystems and the console PRC comprise the data processor unit DPU.

Each of the computer central processors has its own core memory and computer memory control, for example core memory CMM-A and memory control CMC-A for the computer central processor CCP-A, and the duplicate units CMM-B and CMC-B for processor CCP-B. There is also a drum memory system with up to six units in the maximum configuration. The computer memory control has eight ports for each of the duplicate units. The computer memory control CMC-A uses ports 1, 3 and 5 principally for access to the drum memory systems 1, 3 and 5 and may also use ports 2, 4 and 6 for access to the drum memory systems 2, 4 and 6; while the memory control unit CMC-B uses ports 2, 4 and 6 for principal access to the drum memory systems 2, 4 and 6 and may also use ports 1, 3 and 5 for access to the drum memory system 1, 3 and 5. Each of the memory controls uses port 7 for access to its own computer central processor, and may use port 8 for access to the other processor. The memory control unit controls the transfer of data between the main core memory CMM and one of the ports for transfer to a drum memory or the central processor.

Figure 17:
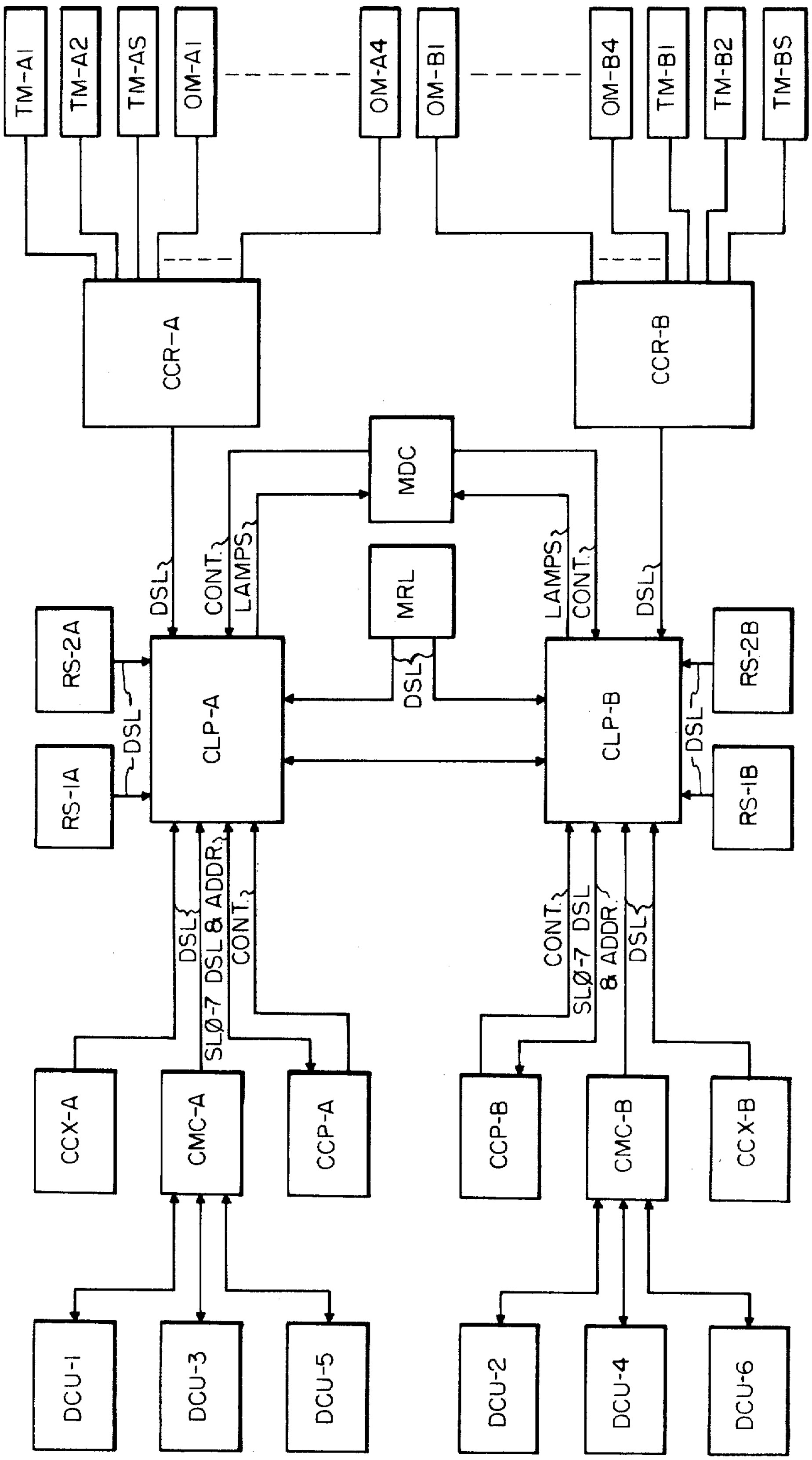
FIG. 17 is a functional block diagram of the computer line processor interfaces.

The computer line processors and their respective interface are shown in FIG. 17 and provide for processing of interrupts from other units in the data processing unit, the register-sender subsystem, and the markers. This unit is duplicated with computer line processor CLP-A coupled to the computer central processor CCP-A and the computer line processor CLP-B coupled to the computer central processor CCP-B, with interconnections between the two computer line processors.

The computer channel multiplex unit CCX-A connected to the computer central processor CCP-A, and unit CCX-B to unit CCP-B provides for input-output functions with various device buffers and the communication registers. The communication register comprising duplicated units CCR-A and CCR-B provides for communication with the markers as shown in FIG. 2. The channel device buffer CDB-A and its duplicate CDB-B provides for input-output to a local maintenance teletypewriter, a high speed paper tape punch, and a data set for remote teletypewriters; while its duplicate CDB-B provides for input-output to a local office administration teletypewriter and a high speed paper tape reader. The ticketing device buffer TDB-A and its duplicate TDB-B (not shown in FIG. 2) provide for coupling to a magnetic tape unit and scanner. The maintenance device buffer MDB-A and its duplicate MDB-B provide for input-output from a pushbutton control panel and displays, power monitors and alarms, and maintenance routine logic.

The registers shown in FIG. 1 are used primarily for arithmetic operations and address modification.

The A register, the main arithmetic accumulator, is a 24-bit register used in data transfer between the central processor and the register-sender, and between the central processor and the channel multiplexer via the data bus, as well as for all arithmetic operations. The A register can be shifted both logically and arithmetically.

The arithmetical operations are performed by the arithmetic logic unit ALU in conjunction with the A, Q, S and Y registers.

The Q register is a 24-bit register used in conjunction with the A register for shift and rotate operations. It is also used as an auxiliary arithmetic register for multiply and divide operations. It is used to hold the multiplier and the lower order bits of the product in a multiply process. For division, it is used for the low order bits of the divident. It accumulates the quotient and finally holds the resultant remainder.

The S register is a 24-bit register used during arithmetic operations and during address modification when placing a main memory address on the address bus.

The Y register is a 24-bit register used during arithmetic and logical operations. It is one of the inputs to the arithmetic logic unit ALU. It cannot be accessed by the program.

The instruction register IR is a 24-bit register that receives all instructions (coded information for the operation to be performed, address field, and the method of addressing) from the main memory via the computer memory control and the data bus.

The three index registers X1, X2 and X3 are 15-bit registers used for address modification, and as a counter.

The page register PR is a six-bit register used to specify bits 15 and 16 of the address bus. It operates in conjunction with the program counter to address a location within a memory page. The page register is made up of three sections: the "instruction field" (bits ϕ and 1), the "branch field" (bits 2 and 3), and the "data field" (bits 4 and 5).

The last program count register LPC is a 15-bit register used to store return linkage to the running program during processing. It is continually updated by the program counter.

The last page reference register LPR is a four-bit register used as an extension of the last program count register. It is continually updated by the page register. The last page reference register is made up of two sections: the "last instruction field" (bits ϕ and 1), and the "last data field" (bits 2 and 3). The "last data field" is loaded from the "data field" of the page register. The "last instruction field" is loaded from the "instruction field" of the page register.

The central processor includes a program counter and a shift counter.

The program counter PC is a 15-bit binary counter used to sequentially count the address of instructions. The program counter holds the address within a page of the next instruction to be retrieved from core memory. It is used with the page register to locate this address. This counter is incremented (increased by one) for each instruction to establish program sequence.

The shift counter SC is a six-bit counter used to control the number of shifts during shifting operations.

SYMBOLISM FOR GATES, BISTABLE DEVICES AND EQUATIONS

The common logic circuits of the system are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bistable storage device. The block symbol for the latch implies inverters at the inputs so that it is set and reset with signals at the "one" level. The logic also uses bistable devices in the form of JK flip-flops implemented with integrated circuits, indicated in the drawings by rectangles having the J and K inputs indicated by a small semicircle, a clock input indicated by C, and set and reset inputs indicated by S and R. Not all of the inputs for these devices are shown in the drawings. The J and K inputs are each actually AND gates having three external inputs, but the unused inputs which are actually terminated in some manner are not shown on the drawings. The S and R inputs are effective at the zero level, the J and K inputs at the one level, and the C input on a trailing edge.

While some discrete transistor circuits are used for interfacing with relay circuits, most of the electronic circuits of the system of FIG. 2 are implemented with integrated circuits of the Sylvania SUHL TTL high level logic family or equivalents. The NAND gates used to implement AND and OR functions include types SG 43, SG 63, SG 132, and SG 143. The AND-OR functions are also implemented with chips having AND gates feeding a NOR gate such as types SG 53 and SG 113. JK flip-flops may be type SF 53.

Boolean expressions are used to designate signal leads in the drawings, and in equations and miscellaneous references in the specification. In the expressions for basic Boolean elements, capital letters, numbers, spaces and hyphens are used. The expressions for elements may also include parentheses enclosing two numbers separated by a hyphen, indicating the first and last of a group of bit positions of gates enabled by a control signal. For example the expression IR(ϕ-5-)-DSO is a single Boolean element. In combinations of elements, the period (.) is used for the AND function, the plus sign (+) for the OR function, and the apostrophe (') for negation. In a string of elements separated by periods and plus signs without parentheses or brackets, the AND operations are performed first and then the OR functions; for example A + B·C + D is the same as A + (B·C) + D. Parentheses and brackets are used in the usual manner indicating operations in inner parentheses are performed first, then those in outer parentheses or brackets, etc. On the dawings the minus sign (—) at the beginning of an expression indicates negation of the entire expression following it, and not merely the first element if there is more than one. The period may be omitted before or after parentheses which implies the AND function; but it cannot otherwise be omitted between elements, since a span can occur within an element.

In the equations, storage devices are indicated by using separate equations for the various inputs. For simple NAND gate type latches the set and reset inputs are indicated by (S) and (R). For JK flip-flops the inputs are indicated by (J), (K), (C), (S)' and (R)'. The apostrophe for the set and reset inputs indicates that the zero level is effective, namely the negation of the expression after the equal sign (=). The trailing edge of the entire expression is effective for the clock input. The combination of the three leads for J and K inputs is indicated by a single equation.

Throughout the description and drawings, it is implied that all circuits and signals relate to unit A of duplicated units, unless specifically indicated by a suffix —A or —1 for unit A, or a suffix —B or —2 for unit B.

TIMING FOR THE COMPUTER CENTRAL PROCESSOR

Figure 4:
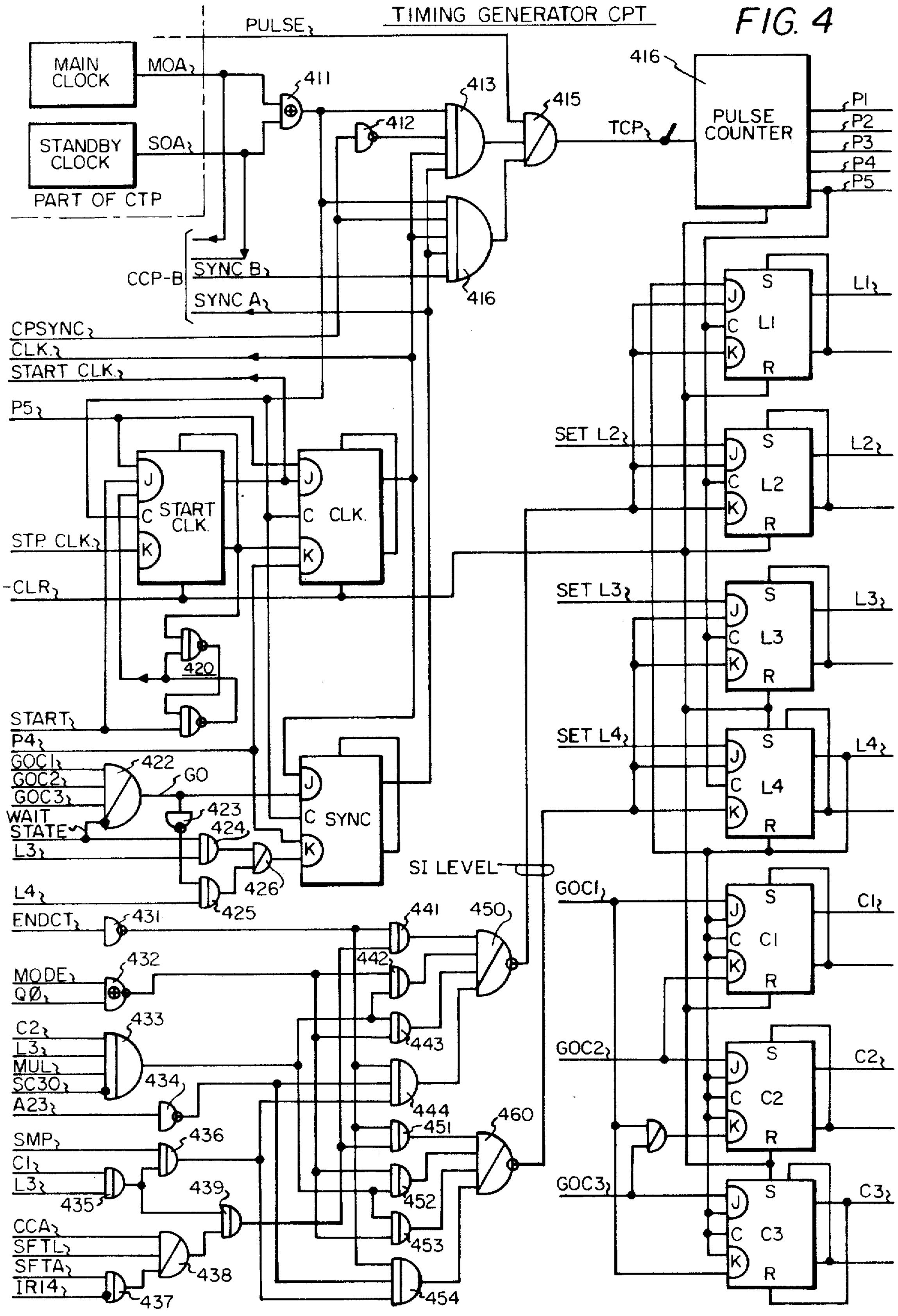
FIG. 4 is a functional block diagram of the processor timing control.

The timing generator CPT is shown in part in FIG. 4. There are additional control circuits not shown which will be described by Boolean equations.

The timing generator is designed to provide the timing increments upon which the instruction set of the central processor is structured. The basic timing intervals are the cycle which is 2 microseconds long, the level which is 500 nanoseconds long, and the pulse which is 100 nanoseconds long.

The timing is dependent upon a source providing a constant train of pulses at a 10 megahertz rate with a duty cycle of approximately 50 percent. This is provided by block circuits which are a main part of the third party circuit CTP. There is provided a main clock having its output train of pulses on lead MOA and a standby clock having its output train of pulses on a lead SOA. The third party circuit includes logic for monitoring the outputs of the clocks and insuring that one and only one of them is supplying output at all times. The two output leads are connected to the timing generators of both of the duplicate computer central processors CCP–A and CCP–B. FIG. 4 is the timing generator CPT of the processor CCP–A. Logic represented by exclusive OR gate 411 gates the train of pulses from whichever of the leads MOA or SOA they are occurring and supplies them to other logic circuits of the timing generator as the basic clock control.

The timing generator includes the three main storage devices that are continually pulsed by the clock train from gate 411. These storage devices are required to permit an orderly shutdown of the timing generator, as well as an orderly processing during operation of the timing generator. These storage devices comprise JK flip-flops START CLK, CLK and SYNC. The clock inputs C of all three are connected to the output of gate 411. The two outputs of flip-flop START CLK feed respectively into the J and K inputs of flip-flop CLK. The purpose of flip-flop CLK is to prime flip-flop SYNC, to prime the basic timing pulse TCP and to prime the data bus and address bus of the computer central processor. The function of the flip-flop SYNC is to act as a primer for the basic timing pulse TCP, and as such is controlled by feedback from the main memory system by the register-sender memory system.

The basic timing pulses on lead TCP are normally supplied from one of the AND gates 413 or 414, but may also be supplied via the lead PULSE from the third party circuit. These three sources are gated via OR gate 415 to the lead TCP. The train of clock pulses from gate 411 is supplied as an input to both gates 413 and 414 as well as the three flip-flops previously mentioned. If the two processors are operating in a synchronization a signal on lead CYSYNC enables gate 414, whereas if the processors are not operating in synchronization the zero level signal on this lead via inverter 412 enables gate 413. If the processors are not in synchronization the coincidence of signals from flip-flops CLK and SYNC along with the signal from gate 412 enables gate 413 to gate the clock pulses via gate 415 to lead TCP; whereas if the processors are operating in synchronization it is required in addition that the duplicated processor have its synchronization flip-flop set to supply a signal on lead SYNC B, enabling gate 414 to supply the pulses via gate 415 to lead TCP.

The pulse counter shown as a single block 416 comprises five JK flip-flops, not shown, whose outputs are respectively P1 through P5. These five flip-flops are connected as a ring counter with the one and zero outputs of each connected respectively to the J and K inputs of the following flip-flop, the P5 outputs being connected to the P1 inputs; and the clock inputs are supplied from lead TCP for all five flip-flops. The counter is advanced on the trailing edge of each clock pulse, thus the outputs appear for 100 nanoseconds on each of the output leads in turn.

The level counter comprises four JK flip-flops L1 through L4. The clock inputs of these four flip-flops are supplied from lead P5, so that the level counter may advance once each 500 nanoseconds on the trailing edge of pulse P5. The output of a gate 450 is connected to the J and K inputs of flip-flops L1 and L2, while the output of a gate 460 is connected to the J and K inputs of flip-flops L3 and L4. In addition flip-flop L1 has another J input from L4, and the flip-flops L2, L3 and L4 have J inputs from leads SET L2, SET L3 and SET L4 respectively.

The cycle counter comprises JK flip-flops C1, C2 and C3. The lead L4 is connected to the clock as well as the J and K inputs of all three of these flip-flops, so that the cycle counter may be advanced once each 2 microseconds on the trailing edge of the pulse on lead L4. In addition the flip-flops have J inputs connected respectively to leads GOC1, GOC2 and GOC3, and a K input of flip-flop C1 is connected to lead GOC2, a K input of flip-flop C2 is connected to an OR gate having inputs from leads GOC1 and GOC3, and a K input of flip-flop C3 is connected to lead GOC1. The signal on lead ⌐CLR is used to set flip-flops P5, L4 and C3 and to reset the other flip-flops.

There are a number of JK flip-flops not shown which are a part of the timing generator, that are combinations of cycles, levels and pulses. It is necessary to supply these signals from storage devices, because if they were implemented with AND gates providing AND and OR functions their outputs would not be stable during the intended interval. Unless otherwise stated the clock inputs for these flip-flops are from lead TCP. The first has J inputs from leads L1, P2, and a lead ⌐C2(MUL + DIV); and K inputs from leads L2 and P5; and provides an output L1(P3 + P4 + P5) + L2. The next flip-flop has J inputs from leads ⌐C2(MUL + DIV), P4 and L2, and K inputs from leads P5 and the output of a gate providing the function L3 + L4); and has an output providing the function (L2·P5 + L3). The next flip-flop has J inputs from leads L1, P4 and the lead ⌐C2(MUL + DIV), and K inputs from leads (L3 + L4) and P1; and provides the output functon (L1·P5 + L2 + L3·L1). The next flip-flop has J inputs from leads (L3 + L4, P3) and ⌐C2(MUL + DIV), and J inputs from leads L4 and P5; providing an output L3(P4 + P5) the next flip-flop has a clock input from lead P4 so that it changes state on the trailing edge of pulse interval P4, a J input from lead L1, and a K input from lead L4; providing the output function (L2 + L3). The next flip-flop has J inputs from leads (L3 + L4, P3) and ⌐C2(MUL + DIV), and J inputs from leads L4 and P5; providing an output L3(P4 + P5) the next flip-flop has a clock input from lead P4 so that it changes state on the trailing edge of pulse interval P4, a J input from lead L1, and a K input from lead L4; providing the output function (L2 + L3). The next flip-flop has a clock input from lead P5, a J input from lead L2, providing the output function (L1 + L2). The last flip-flop has a J input from lead P2 and a K input from lead P5; providing the output function (P3 + P4 + P5).

The length of instructions for the time required to process an instruction can vary with the type of instructions. Some instructions require only one cycle to process while others require two cycles. One instruction and traps require three cycles. Certain instructions although only two cycles circulate within a cycle as in shift instructions. Because of these differences controls are provided that allow the timing generator to go from cycle 1 to cycle 2 to cycle 3; or to set level 2, or to set level 3 or set level 4. Since some instructions require the contents of memory and cannot continue processing until the memory has retrieved the contents, or some instructions write into memory, and cannot continue until the write function is complete, a wait control is implemented to reset the flip-flop SYNC which in turn suspends the timing generator from proceeding until a feedback is received from memory. The feedback signals from the main memory via memory control include DAP7 and DLP7 designating respectively data available and data loaded at port 7; while the feedback signals from the register-sender subsystem are RSDAL and RSDLL for data available and data loaded respectively. The timing generator control logic is given by the following equations.

| | |
|---|---|
| GOC1 | =DAP7[IR23+PC−ASO(C2′+ZELO1′)+XEC] |
| | +PREGOC1 |
| GOC2 | =C24INST·C1·L4·DAP7 |
| | +C1·L4·DAP7·C23INST·CCA′·SMP′·BSP′· |
| | (PRA+CPD·TSTCPD)′ |
| | +(BSP+STC)·MMDLL |
| | +C1·(CCA+SMP) |
| | +C1·(DIV+TRAP) |
| | +RSDAL·(PRA+CPD·TSTCPD) |
| GOC3 | =(DIV+ZELO1)·C2·L4 |
| RS DLL | =RSSEL′·CRS1·RS1DLL |
| | +RSSEL·CRS2·RS2DLL |
| | +RSSEL′·CRS1′·RS1DLL |
| | +RSSEL·CRS2′·RS2DLL |
| RS DAL | =RSSEL′·CRS1·RS1DAL |
| | +RSSEL′·CRS1′·RS1DAL |
| | +RSSEL·CRS2·RS2DAL |
| | +RSSEL·CRS2′·RS2DAL |

DEFINITIONS

| | |
|---|---|
| ACKN | ACKNOWLEDGED RECEIPT OF DATA FROM I/O |
| ADA | =OUTPUT OF ADDER TO RA |
| ADDI | INDICATION THAT A CORRECTIVE ADDITION OF ONE MUST TACKED ON TO THE QUOTIENT |
| ADZ | =OUTPUT OF ADDER EQUALS ALL ZEROS. |
| AND | =LOGICAL AND |
| A-DSO | =REGISTER "A" AS A DATA SOURCE |
| A23IN | =DATA INTO BIT 23 OF REG.A |
| BCHI | =A STORED BRANCH INDICATOR |
| BDIS | PRCF BUTTON DISPLAY ENABLE |
| C STROBE | SIGNAL USED TO STROBE DATA BUS DURING CPD |
| CAR (S) | =CARRY,OUT OF BIT 23 OF ADDER,STORED |
| CCX-DSO | =CHANNEL MULTIPLEX AS A DATA SOURCE |
| CLR | =CLEARS TO AN INITIAL STATE THE FOLLOWING: RA,RO,Y,IR,X1,X2,X3,PC·SC,TP TRAP, START CLK,CLK,SYNC,MMREAD,MMWRITE LOCKOUT, CARRY,OVF,EVEN PARITY TEST STORAGE,LATCH AB, TST CPD,WMPB,PCINH,RSSEL,TRAP DISABLE, XH,LOAD LPC INHIBIT,BRH,INST,SW TO STDBY RT CLK,QZ,MADD,ADDI,INX,INTIN,INOP,SREJECT, |
| C0 | =CARRY INTO BIT 0 OF ADDER |
| COUNT SC | COUNT SHIFT COUNTER |
| CRS1 | SELECT REGISTER SENDER 1 UNIT A WHEN SET, AND RS 1 UNIT 1B WHEN RESET |
| C13 INST | =INDICATES AN INSTRUCTION THAT ACCESS MEMORY DURING CYCLE 1 LEVEL 3 |
| C23 INST | =INDICATES AN INSTRUCTION THAT ACCESS MEMORY DURING CYCLE 2 LEVEL 3 |
| DEPE | =DATA EVEN PARITY ERROR |
| DIVZ | INDICATES A DIVISION BY ZERO |
| DSTROBE | DATA STOBE TO CCX |
| DS-DSO | =PRCF DATA SWITCH REGISTER AS A DATA SOURCE |
| ENWD | =ENABLE WATCHDOG TIMER |
| EXO | =EXCLUSIVE "OR" |
| IEPE | =INSTRUCTION EVEN PARITY ERROR |
| INHIBIT | =INHIBIT OF OP CODE |
| INVERT | =INVERTS THE OUTPUT OF Y REG. 1'S COMPL. |
| INOP | INHIBITS LOADING OF OPERATION FIELD IN IR |
| INVOP | ERROR INDICATING AN INVALID OP CODE |
| INX | INDICATION OF A NON INDEXABLE INSTRUCTION |
| IRL-DSO | =INSTRUCTION REG BITS (12–23) AS A DATA SOURCE |
| IS SYNC | SYNC PULSE SENT TO THE CLP |
| LATCH AB | =LATCH ADDRESS BUS |
| LBF | LOAD BRANCH FIELD OF PAGE REGISTER |
| LDF | LOAD DATA FIELD OF PAGE REGISTER |
| LOAD AL | LOAD RA BITS 12–23 |
| LOAD AR | LOAD RA BITS 0–11 |
| LOAD LPC | LOAD LAST PROGRAM COUNT REGISTER |
| LOAD SC | =LOAD SHIFT COUNTER |
| LPC-DSO | =LAST PROGRAM COUNT AS DATA SOURCE |
| SET L2 | =C2·L3·MUL·SC30'(MODE·Q0'+MODE'·Q0)+ C2·L3·DIV·SC31'+L1(C2'+ Q0+MUL') |
| SET L3 | =C1·L1·MUL·Q0'+L2(C1'+(SMP'+A23')(ENDCT'+ (CCA+SFTA+SFTL)') |
| SET L4 | =L3(C2'+SC30)(C2'+DIV1+SC31)+C1·L2 (SMP·A23+ENDCNT(CCA+SFTA+SFTL) |
| START | =TP POWER ON(RUN+INC+STEP+EXP B)+TP INC+ TP STEP+TP RUN |
| STP CLK | =P3(INC+TP INC)+P3·PC−ASO·L4·((TP POWER ON) (STEP+ADDRESS MATCH+EXPB)+HLT+TP STEP) |
| WAIT STATE | =C1·(STX+STA+STQ)· +C1·PAR·RSDLL' +C2·MMDLL'(ADM+AOM+XAM+RPA+SOM) |

BUS SOURCES

Figure 5:
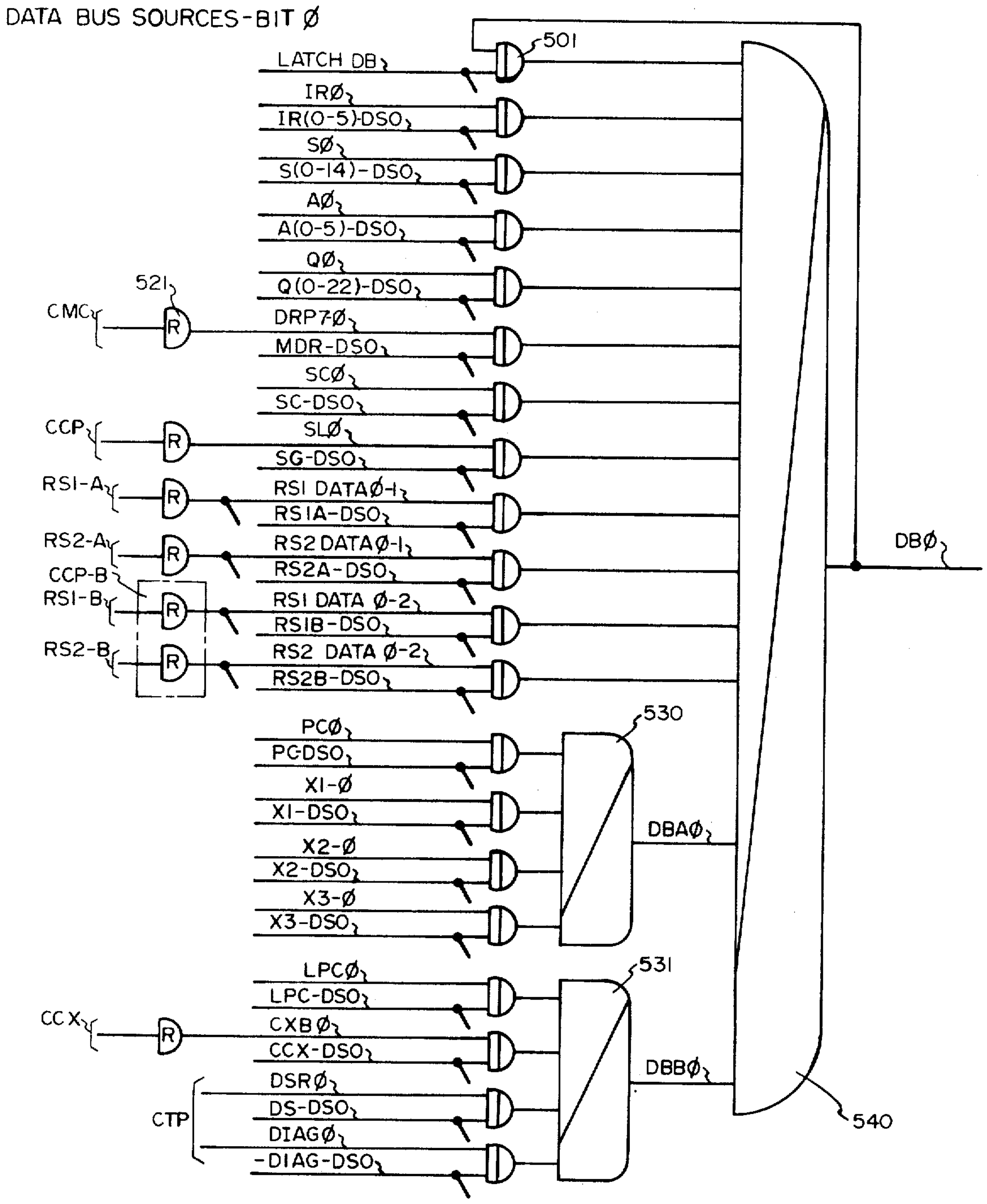
FIG. 5 is a functional block diagram showing the sources for data bit $\phi$.
Figure 6:
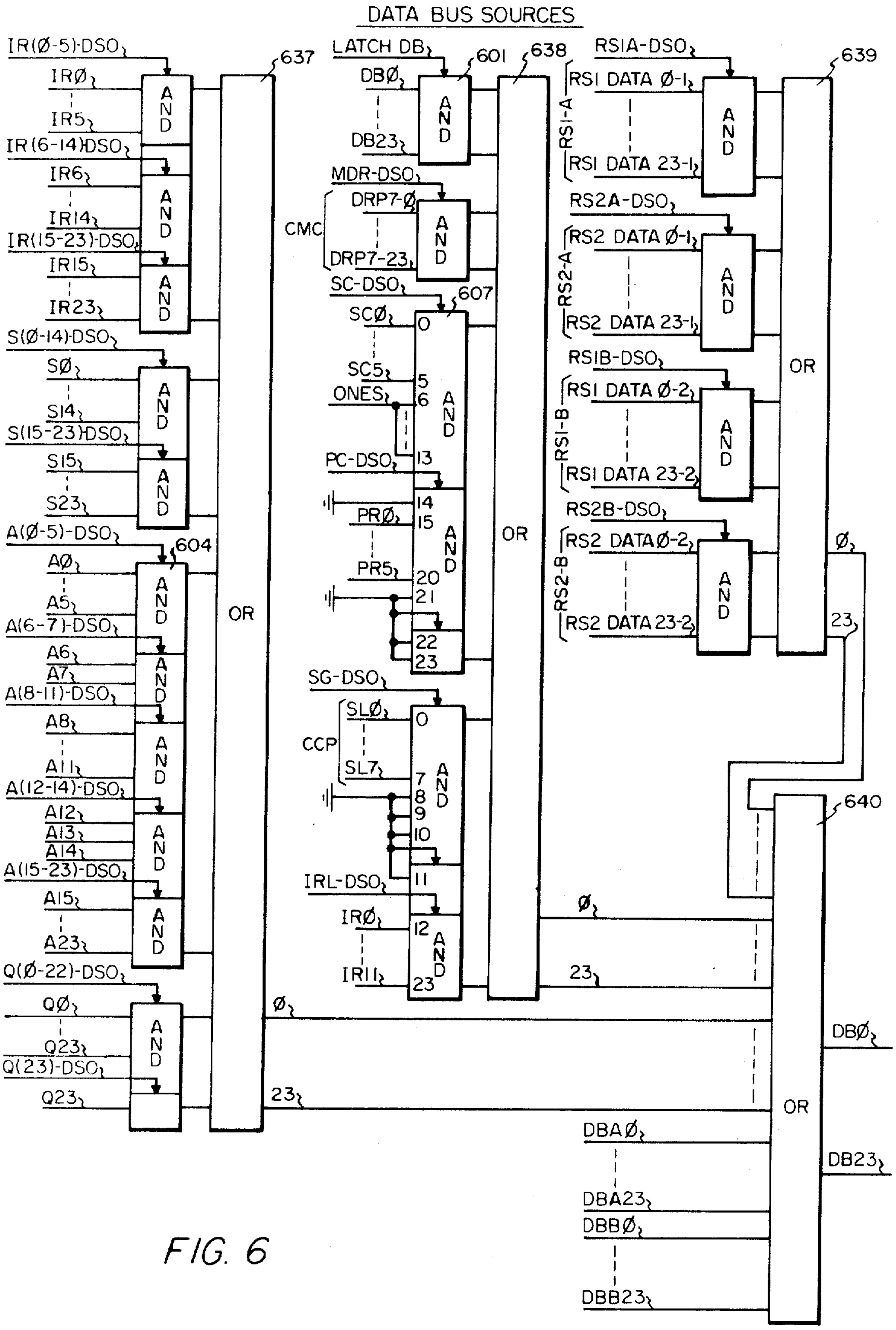
FIGS. 6 and 7 are functional block diagrams showing the data bus sources for all bit positions.

The data bus sources for the bit in position ϕ is shown in FIG. 5, while the sources for all bit positions are shown in FIG. 6. For each bit position of each source there is a two input AND gate with one input being the signal source for that bit position and the other input being an enabling control signal. For example AND gate 501 has a signal source lead DBϕ and an enabling control signal lead LATCH DB. In each bit position the outputs of all these AND gates are combined through OR gate circuitry to the single bit position lead for the bus. FIG. 5 shows some of the sources combined by OR gate 530 to lead DBAϕ and other sources combined through OR gate 531 to lead DBBϕ. The outputs of these two OR gates and the other AND gates are combined by circuits represented by the symbol 540 to lead DBϕ. Symbol 540 in actual practice of course comprises a plurality of gates combined to provide the OR function. To show signal sources received from other subsystems on different frames via cables, cable receivers such as 521 are shown in FIG. 5, with the subsystem designated by a mnemonic preceding a bracket. For example the signal on lead DRP7–0 is received from the computer memory control unit CMC. Signals received from the B units of the two register sender subsystems are received via cable receivers of unit CCP–B and supplied to both units CCP–A and CCP–B. Similarly the signals received from the A units of the register sender subsystems following the cable receivers of unit CCP–A are supplied to both the A and B units of the computer central processor CCP.

Figure 7:
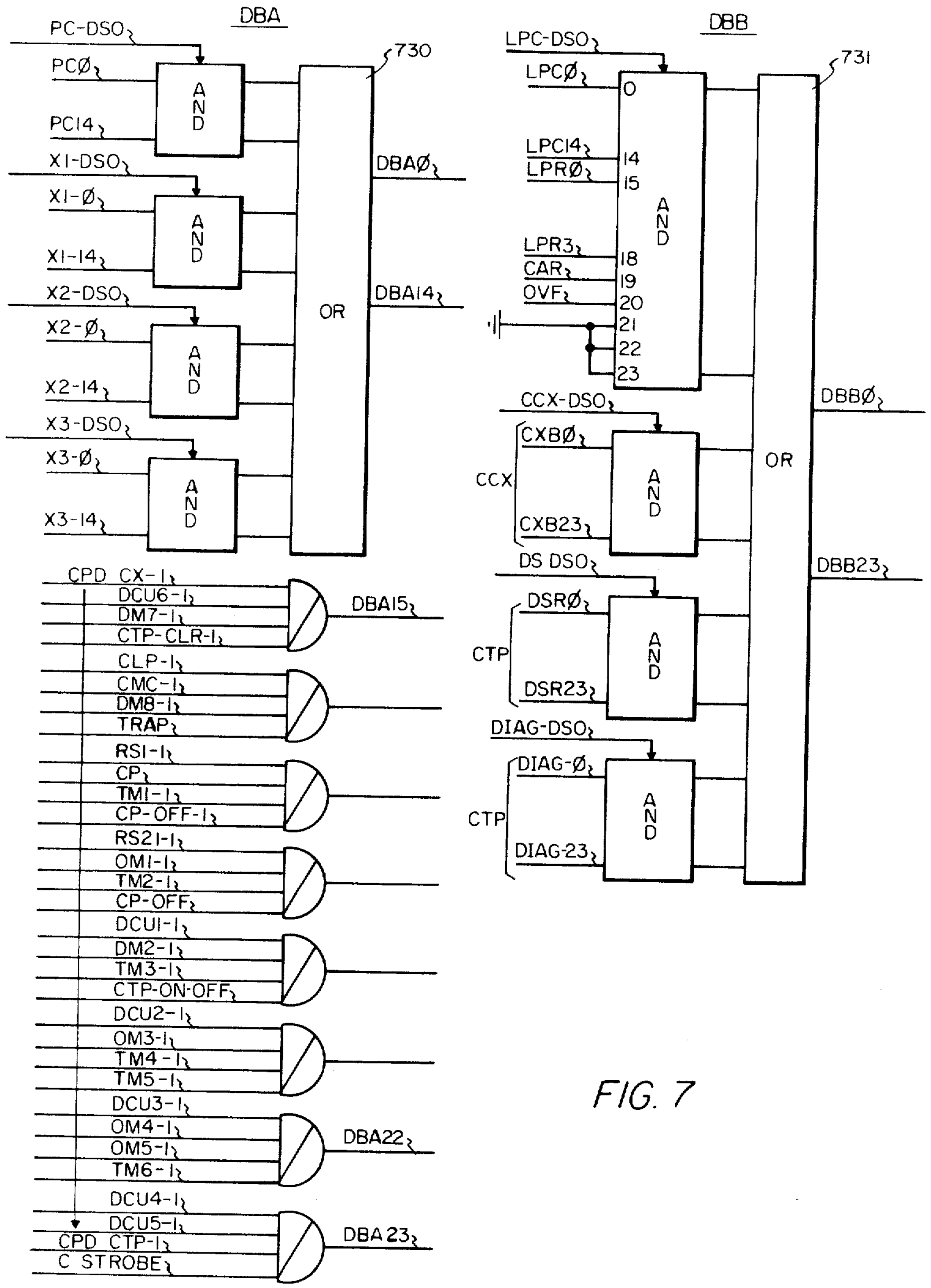
Figure 11:
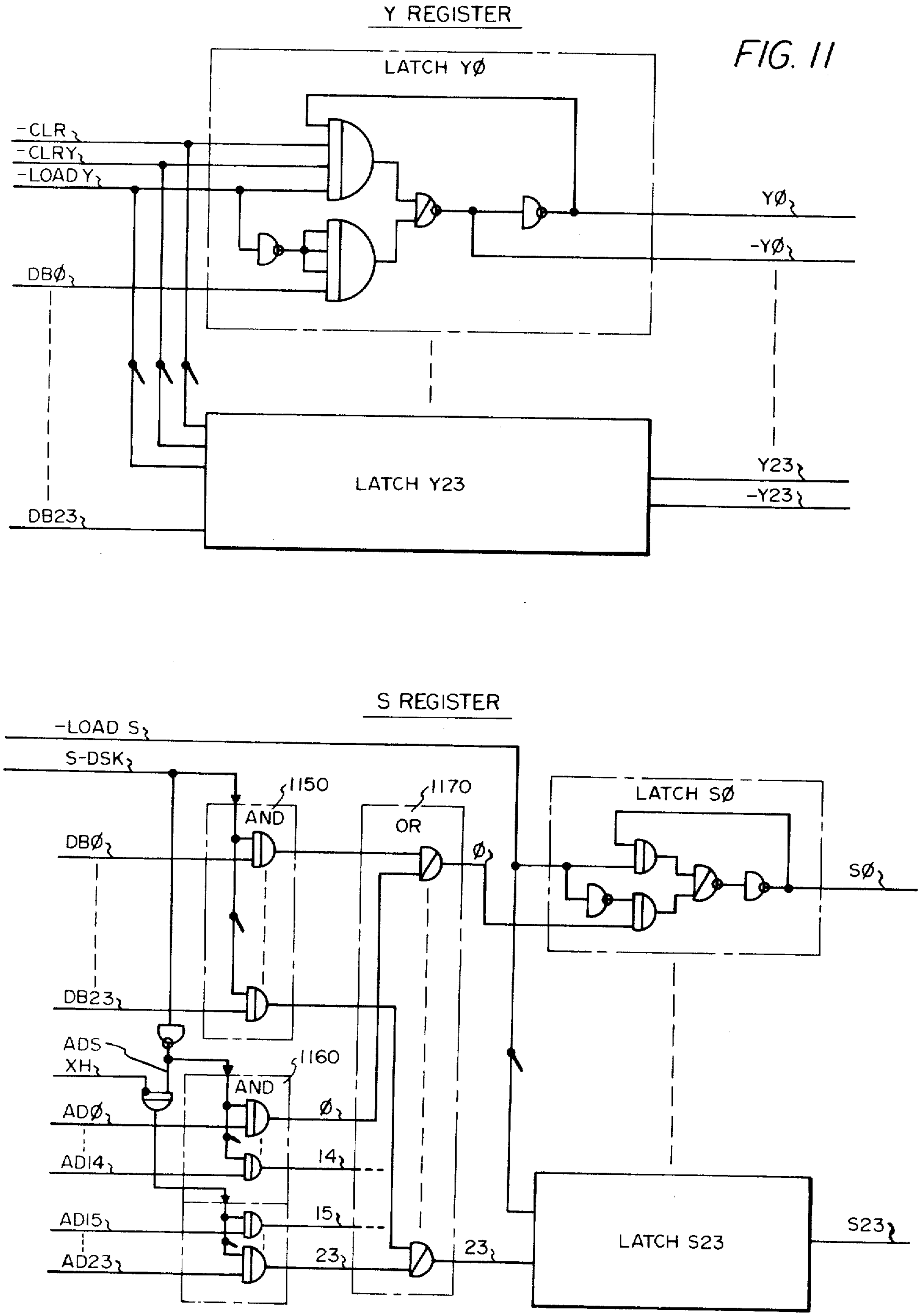
FIG. 11 is a functional block diagram of the Y and A registers.

In FIG. 6 and in several of the other figures, rectangular blocks designated AND are used to represent a set of AND gates having signal sources from the respective bit positions and a common enabling signal; and blocks designated OR are used to represent the set of OR logic for the several bit positions combining signals from the AND blocks. The arrangement of the gates within these blocks is shown at the bottom of FIG. 11 with block 1150 representing an AND block and 1170 representing an OR block. In some cases the bit positions are subdivided into groups with different enabling signals; for example in the block 604 the control signal A(ϕ–5)-DSO enables bit positions ϕ–5, the control signal A(6–7)-DSO enables the gates for bit positions 6 and 7, etc. The signal source leads for block 604 are all from the A register; but in some cases the signal sources for different bit positions will be from different registers or other sources. For example in block 607 the control lead SC–DSO enables bit positions ϕ–13 to gate the signals from bit position ϕ–5 from the shift counter SC with ones into bit positions 6–13, while the signal on lead PC–DSO enables bit positions 12–21 to gate a 0 into bit position 14, the signals from the page register PR in the bit positions 15–20, and a 0 into bit position 21. In bit positions 22 and 23 both the enable signal and the source leads are 0's so that the output from these positions is always 0. The signal ONES is derived from an electronic ground via an inverter. For 0's electronic ground is used directly. The OR gating corresponding to block 540 in FIG. 5 is represented in FIG. 6 by OR blocks 637, 638 and 639 feeding OR block 640 for convenience. The OR function gating corresponding to gates 530 and 531 is shown in FIG. 7 by blocks 730 and 731 respectively. The block 730 has only 15 bit positions for sources from the index registers and program counter which likewise have only 15 bit positions. The other signals for leads DBA15–DBA23 are derived from OR gates having four inputs each from control pulse directive CPD sources except that the last input of the gate for bit position DBA23 is the signal C STROBE.

As shown by AND gate 501 which is a part of the AND logic 601, the Data Bus leads DB–ϕ to DB–23 are connected back as input data sources. These AND gates are enabled by the signal LATCH DB, so that any ones appearing on the data bus are latched as long as the signal LATCH DB is true. However, it is possible to enable another source to gate additional 1's onto the data bus.

Figures 8, 9:
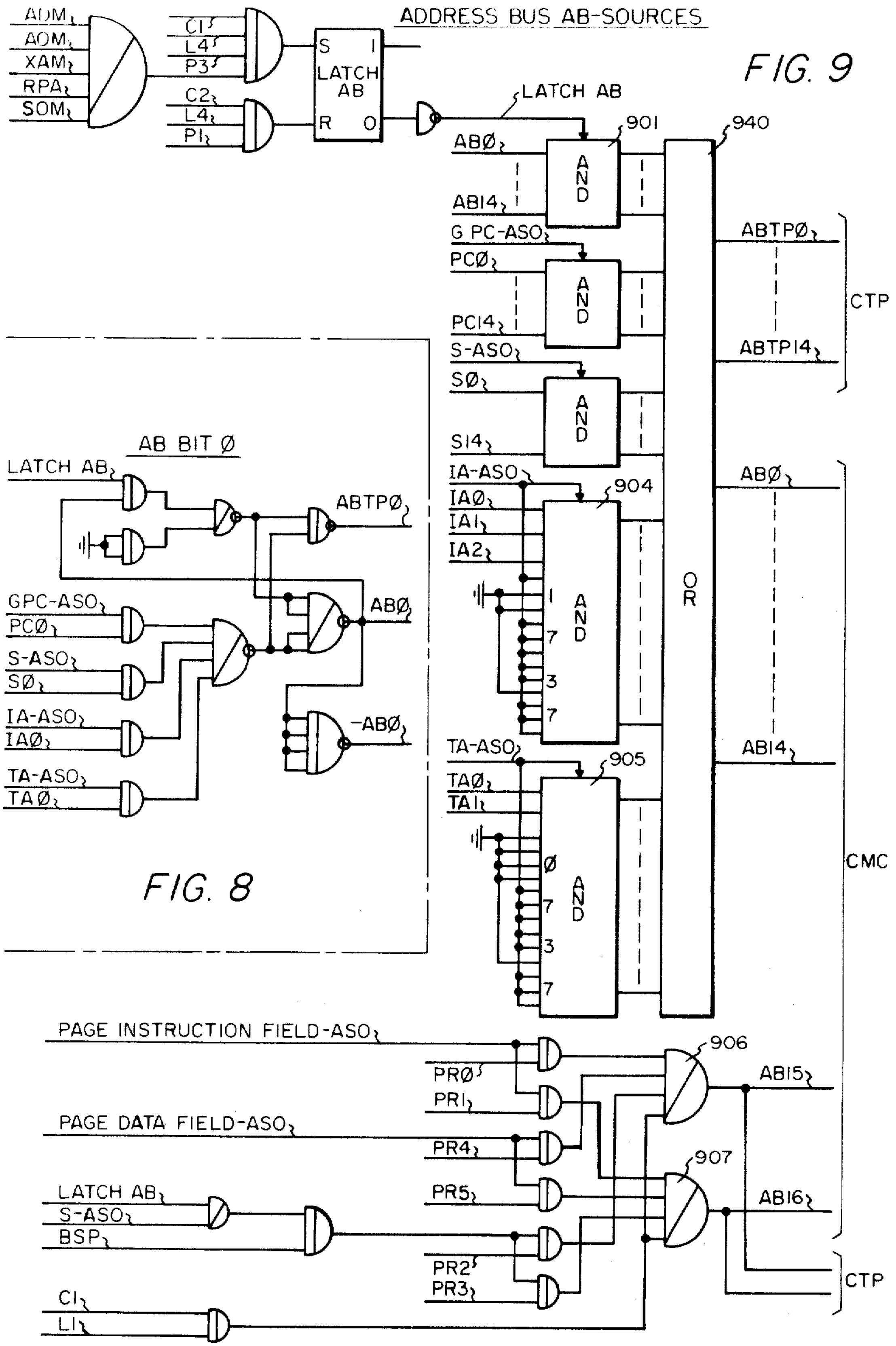
FIG. 8 is a functional block diagram showing the address bus sources for bit $\phi$.
FIG. 9 is a functional block diagram showing all of the address bus sources.

The sources for the address bus AB are shown in FIG. 8 with the actual logic for bit ϕ, and in FIG. 9 for fifteen bit positions via the OR logic 940 plus two additional bit positions from the page register. Latching of the address bus is provided via AND logic 901 with bits ABϕ to AB14 as sources enabled by the signal LATCH AB. This latter signal is provided by a latch which is shown along with its setting and resetting logic.

The program counter is used as a source when the enabling signal GPC–ASO is true, and the S register is used as a source when the enabling signal S–ASO is true.

For interrupts the AND logic 904 is enabled by signal IA–ASO. Four of the five octal digits for the address source are provided by hardwired inputs so that the address is 7371X, where the value of X is determined by the three inputs 1A0, 1A1 and 1A2 which are received from the computer line processor CLP. For traps the address is provided by AND logic 905 enabled by a signal TA–ASO to provide a wired address 737ϕX, where the value of X depends on signals TA0 and TA1 derived from the computer third party CPT.

The paging bits of the address are supplied via OR gates 906 and 907 for bit positions AB15 and AB16 respectively, with the logic providing inputs from the page register as shown.

REGISTERS OF THE COMPUTER CENTRAL PROCESSOR

The registers shown in the block diagram of FIG. 1 are shown in more detail in FIGS. 10–15.

Figure 10:
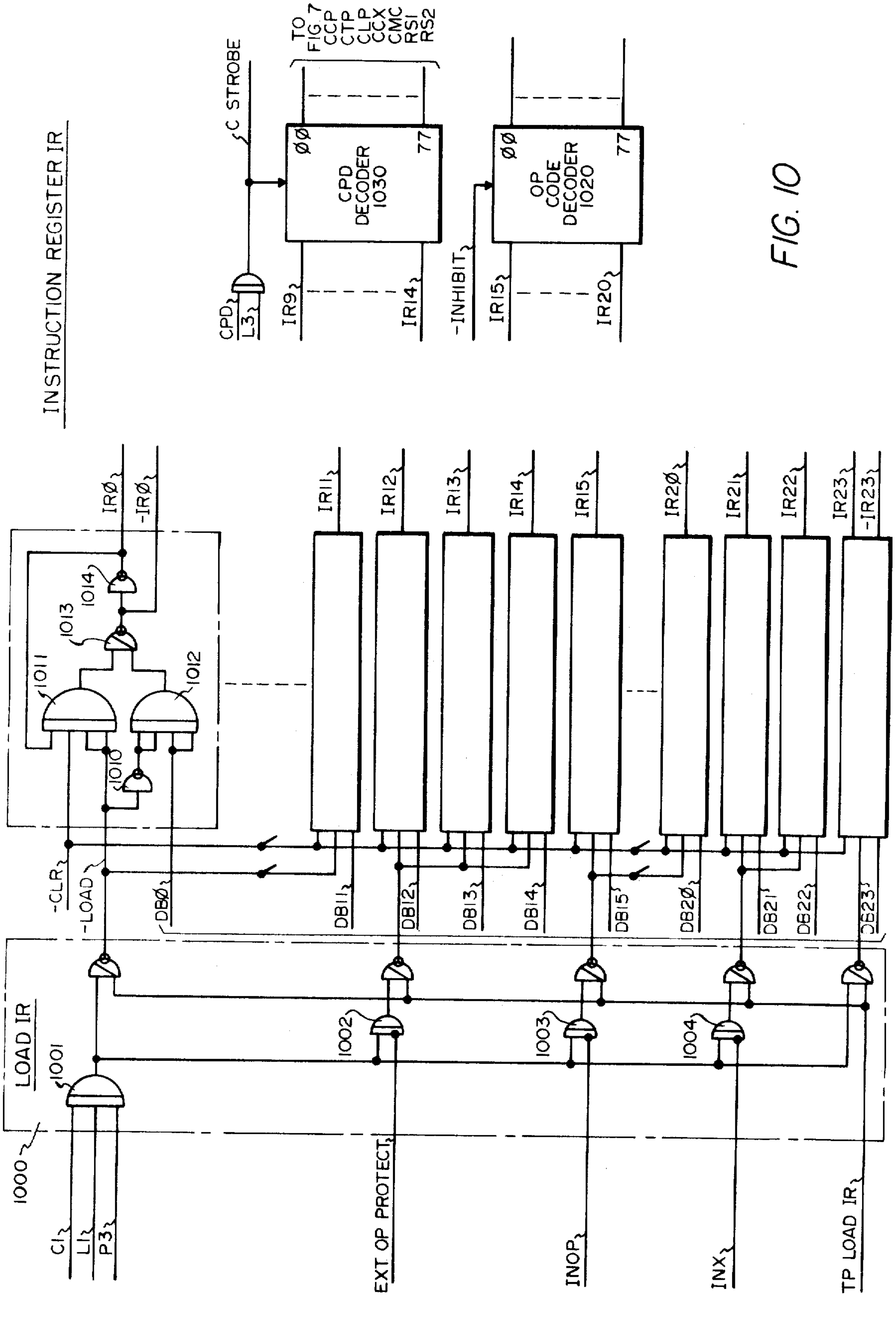
FIG. 10 is a functional block diagram of the instruction register.

The instruction register IR comprises 24 storage devices in the form of latches. Each of the latches comprises an integrated circuit chip comprising two four-input AND gates such as 1011 and 1012 feeding a NOR gate such as 1013. The output from gate 1013 via an inverter 1014 supplies the output signal IRϕ, while the output from gate 1013 is the negative signal –IRϕ. Both the true and inverted signals may be taken from each of the latches. The instruction register is loaded from the data bus bits DBϕ–DB23. The load signal to the latches is supplied in inverted form shown as an input to the latches for positions IRϕ–IR11 as –LOAD. The loading of these latches depends on a time delay achieved in the inverters such as 1010. For example when the signal LOAD becomes true (–LOAD false) then via inverter 1010 the upper input of AND gate 1012 is enabled and if the source signal DBϕ is also true then the output of the latch becomes true. This output is fed back to the upper input of AND gate 1011. When LOAD goes false (–LOAD true) then gate 1011 is enabled to maintain the latch set before the upper input of gate 1012 becomes false. The signal on lead –CLR is normally true, and when it goes false it clears all of the latches to zero. The LOAD IR logic is shown in simplified form within block 1000. During normal operation the AND gate 1001 is enabled in response to the condition C1·L1·P3, which normally is the necessary condition for loading all bit positions. The loading of bit positions IR12, IR13 and IR14 may be inhibited at gate 1002 by the signal EXT OP PROTECT, the loading of bit positions IR15–IR2ϕ may be inhibited at gate 1003 by the signal INOP, and the loading of bit positions IR21 and IR22 may be inhibited at gate 1004 by the signal INX. All bit positions may alternatively be loaded by the third party signal TP LOAD IR. FIG. 10 also shows the OP code decoder 1020 for the instruction set, and a control pulse directive decoder 1030. The control pulse directive decoder 1030 is enabled by the signal on lead C STROBE which is true in response to the condition CPD·L3. It decodes the value of the control pulse directive from the six bit positions IR9–IR14 which provide the output octal codes ϕϕ to 77. These outputs are supplied to the data bus as shown in FIG. 7, and also to the various subsystems to which they apply.

TABLE A

| | | | |
|---|---|---|---|
| OPOO — | OP20 ADX | OP40 ADD | OP60 PRA |
| 01 ADI | 21 SBX | 41 SUB | 61 PAR |
| 02 SBI | 22 CAX | 42 MUL | 62 BSP |

TABLE A-Continued

| | | | |
|---|---|---|---|
| 03 HWL | 23 CSX | 43 DIV | 63 — |
| 04 HWS | 24 IBP | 44 AOM | 64 LDQ |
| 05 SEL | 25 IBN | 45 SOM | 65 STQ |
| 06 LSGA | 26 STX | 46 ADM | 66 LPR |
| 07 SSNT | 27 — | 47 XEC | 67 HLT |
| 10 RTN | 30 BPX | 50 ANA | 70 SMNT |
| 11 BUN | 31 BNX | 51 ORA | 71 SMNZ |
| 12 SFTL | 32 BZX | 52 ERA | 72 SANE |
| 13 BZA | 33 CCA | 53 XAM | 73 SANG |
| 14 BNA | 34 SFTA | 54 LDA | 74 LDC |
| 15 BPA | 35 BAO | 55 STA | 75 STC |
| 16 BRR | 36 RTR | 56 CSA | 76 SAMQ |
| 17 CPD | 37 MIS | 57 RPA | 77 SMNN |

The outputs of the OP Code decoder 1020 represent the decoding of the six instruction register bits IR2ϕ–IR15 along with the signal INHIBIT'. The six IR bits are expressed as two octal digits. For example ADM = OP46 = IR20·IR19'·IR18'·IR17·IR16·IR15'·INHIBIT. The full decoding is shown in Table A. Note that codes OPϕϕ, OP27 and OP63 are invalid codes which via an OR function gating provide the signal IOP.

The Y register shown at the top of FIG. 11 comprises twenty-four latches similar to those used in the instruction register. This register is also loaded from the data bus bit positions DBϕ–DB23 in response to an LOAD Y signal. The S register shown at the bottom of FIG. 11 also comprises twenty-four latches similar to those of the IR register, except that the AND gates have only two inputs. This register may be loaded from either the data bus or the arithmetic logic unit in response to a signal LOAD S. It is loaded from the data bus via AND logic 1150 when the signal on lead S–DSK is true indicating that the S register is the data sink. It is loaded from the arithmetic logic unit bits ADϕ–AD23 via AND logic 1160 in response to an enabling signal on lead ADS, which is true whenever the signal on lead S–DSK is false. The bit positions 15–23 are inhibited when the signal on lead XH is true to prevent loading from bits AD15–AD23. The outputs from the AND logic 1150 and 1160 are passed through OR logic 1170 to the data inputs of the S register. The arrangement of the gates within the blocks 1150, 1160 and 1170 is shown here, whereas in other figures only the blocks are shown to represent the same form of logic.

Figure 12:
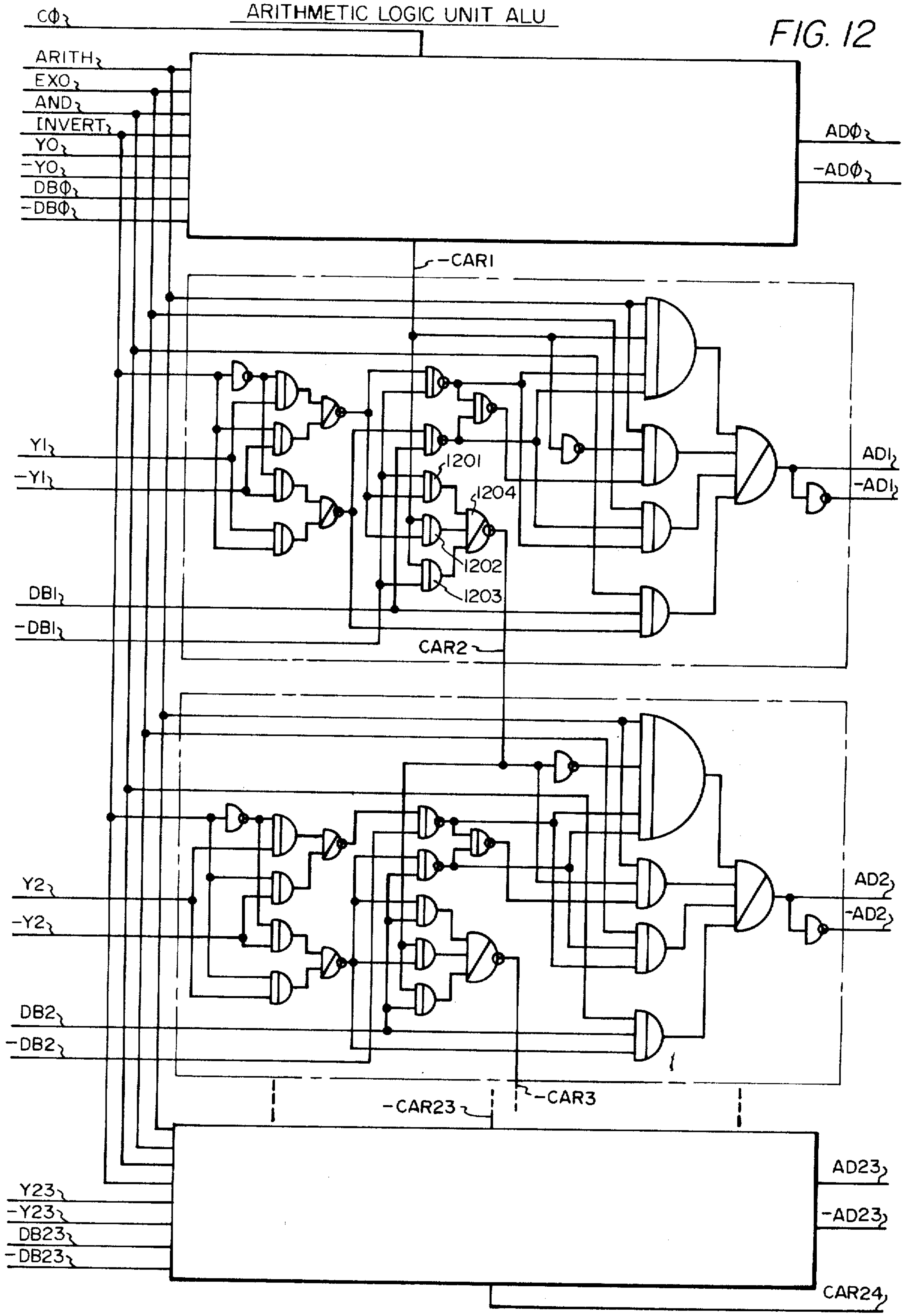
FIG. 12 is a functional block diagram of the arithmetic logic unit.

The arithmetic logic unit ALU is shown in FIG. 12. This is a 24 bit parallel adder. The circuit for bit positions AD1 and AD2 is shown in detail. The data inputs to the register are from the Y register and the data bus, and the output on leads ADφ–AD23 is the result of the arithmetic operation. A feature of the adder is that the carry output from each bit position is from an integrated circuit chip which as shown for bit position AD1 comprises a two-input AND gates 1201, 1202 and 1203 feeding an NOR gate 1204. The chip actually contains four AND gates but one of them has its inputs connected to ground. The arrangement is such that the carry output from all of the odd positions is in true form while that from even positions is an inverted form. With this arrangement the carry is propagated through all of the bit positions via only the single integrated circuit chip for each position, thus minimizing the propagation time.

When the signal ARITH is true the output is the sum of the contents of the Y register and data bus. When the signal EXO is true the output is the exclusive OR function of the Y register and data bus. When the signal on lead AND is true the output is the AND function of the Y register and data bus. To provide the OR function the signals on leads AND and EXO are supplied simultaneously. To provide the subtract function with 2's complement arithmetic the signals on lead INVERT and the carry input on lead Cφ are provided. To simply invert a number in 2's complement form it is supplied into the Y register, with the data bus all zeros, and the signals INVERT and Cφ are provided.

Figure 13:
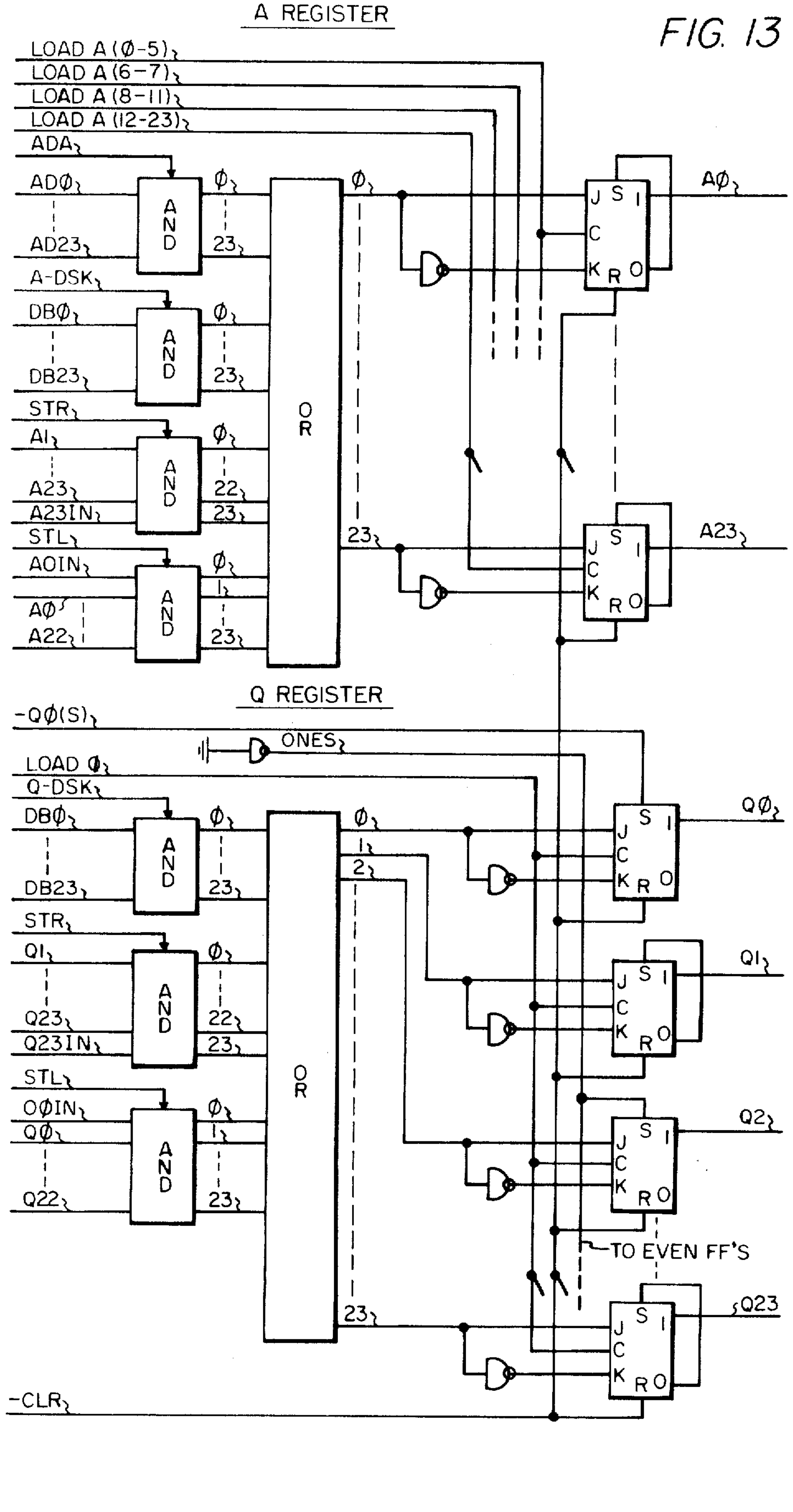
FIG. 13 is a functional block diagram of the A and Q registers.

The A register and Q register are shown in FIG. 13. These registers each comprise 24 JK flip-flops. These registers are loaded by supplying a load signal to the clock inputs and supplying the data to be loaded to the J inputs and inverted to the K inputs. The clock input for the Q register is LOAD Q, while for the A register the flip-flops are divided into four groups with separate load signals to the clock inputs as shown. Both registers may be set to all zeros by a signal on lead –CLR at zero level. Register A may be loaded from the arithmetic logic unit bits ADφ–AD23 with an enabling signal ADA, may be the sink for the data bus bits DBO–DB23 with the enabling signal A–DSK, may be loaded from its own output shifted one bit position to the right and supplying the signal A23IN for the twenty-third bit with an enabling signal STR, and may be loaded from itself shifted one bit to the left and supplying the signal AφIN for bit position zero with an enabling signal STL. Similarly the Q register may act as a data sink for the data bus with an enabling signal Q–DSK, may be loaded from itself shifted one bit position right and a signal Q23IN in the twenty-third bit position with an enabling signal STR, and may be loaded from itself shifted one bit position left with a signal QφIN in bit position zero with an enabling signal STL. The flip-flop Qφ may also be set by a zero level signal on lead –Qφ(S).

Figure 14:
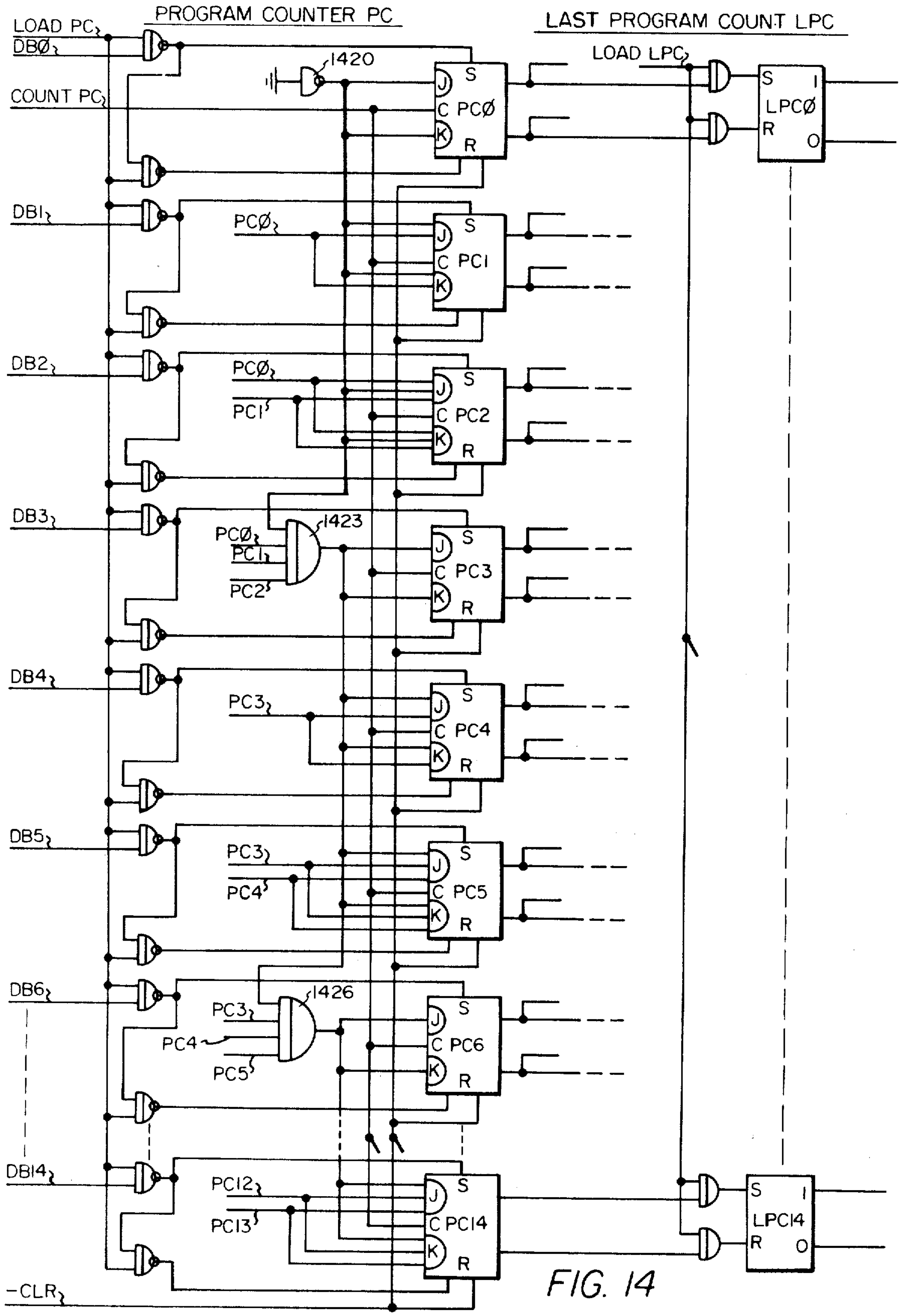
FIG. 14 is a functional block diagram of the program count and last program count registers.

The program counter PC and last program count register LPC are shown in FIG. 14. The program counter PC comprises fifteen JK flip-flops connected as a binary counter, advancing one count each time a trailing edge of a pulse appears on lead COUNT PC connected to the clock inputs. The counter may also be loaded from the data bus in response to a signal on lead LOAD PC, the loading being effective via the asynchronous inputs S and R. The counter may also be cleared by a zero level signal on lead –CLR to the second reset input of each flip-flop. The first seven flip-flops and the last one have been shown in order to illustrate the binary counting logic at the J and K inputs. The logic is arranged in groups of three flip-flops which with each having an AND gate supplying J and K inputs of all three, for example gate 1423 supplies J and K inputs of flip-flops PC3, PC4 and PC5 with the inputs of gate 1423 being from the preceding three flip-flops PC/, PC1 and PC2, and one input from the AND gate of the preceding three flip-flops. The second flip-flop of each group, for example flip-flop PC4 also has J and K inputs from the preceding flip-flop, namely, PC3, while the third flip-flop of each group such as PC5 has J and K inputs from both of the other flip-flops, namely PC3 and PC4. The output of gate 1423 is then supplied as an input to gate 1426 for the next group of three, etc. For the first group of three instead of an AND gate an inverter 1420 with input from ground is substituted.

The last program count register comprises fifteen latches of the type each comprising two NAND gates. AND gates are provided to load the output of the program counter PC into the last program count register LPC in response to a signal on lead LOAD LPC.

Figure 15:
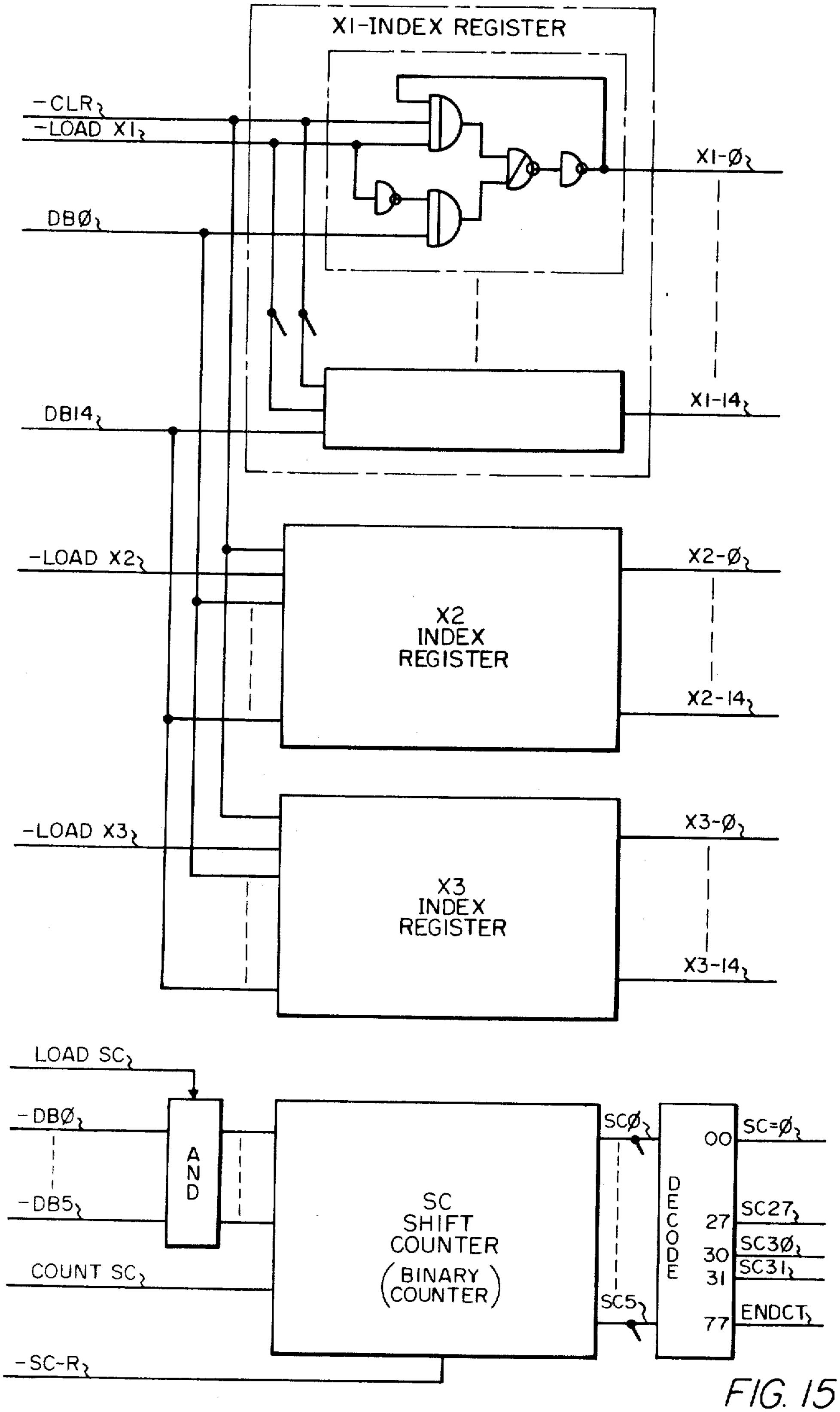
FIG. 15 is a block diagram of the index registers and a shift counter.

The three index registers X1, X2 and X3 shown in FIG. 15 each comprise 15 latches similar to those used in the instruction register and Y register. Each of these registers may be loaded in response to each individual load command from the 15 low order bits of the data bus.

The shift counter SC shown at the bottom of FIG. 15 is a six-bit counter with JK flip-flops generally similar to the program counter PC. The count is advanced once upon each occurrence of a trailing edge on lead COUNT SC. The counter may be loaded via AND logic from the inverted six low order bits of the data bus in response to the command LOAD SC. The output of the counter is decoded for certain values as shown, SC =0 for the state in which all the flip-flops are set to zero, SC27, SC30 and SC31 for corresponding octal values, and ENDCT for the octal value 77.

CONTROL LOGIC FOR THE COMPUTER CENTRAL PROCESSOR

The control unit logic block CPC in FIG. 1 represents the logic for supplying the control signals for transferring data and address information among the registers and buses. The definitions of the various signals, and the Boolean equations follow.

| | |
|---|---|
| MADD | INDICATES THAT AN ADDITION PROCESS DURING MULTIPLICATION |
| MODE | INDICATES SUCCESSIONS OF '1'S''OR''O''S''IN MUL |
| OFV | =OVERFLOW |
| PBRM | PROTECT BIT OF REFERENCED MEMORY |
| PCINH | INHIBITS COUNTING OF PROGRAM COUNTER |
| PC | =PROGRAM COUNTER |
| PC-DSO | =PROGRAM COUNTER AS A DATA SOURCE |
| PEP7 | =PORT 7 ERROR THAT INDICATES AN ERROR HAS OCCURRED IN THE COMPUTER MEMORY CONTROL CIRCUIT RELATIVE TO PORT 7 WHICH IS ASSIGNED TO THE CENTRAL PROCESSOR. THE ERROR IS CAUSED |

Continued

WHEN THE CCP ADDRESSES A LOCATION OUTSIDE THE RANGE OF MEMORY, OR WHEN THE CCP ATTEMPS TO WRITE INTO READ ONLY MEMORY

Q0IN =DATA INTO BIT 0 OF RQ
Q23IN =DATA INPUT TO REG.Q BIT 23 DURING A SHIFT
REI =RESET ERROR INDICATORS
RS1B-DSO =REGISTER SENDER 1 UNIT B AS DATA SOURCE
RS1A-DSO =REGISTER SENDER 1 UNIT A AS DATA SOURCE
RS2A-DSO =REGISTER SENDER 2 UNIT A AS DATA SOURCE
RSSEL SELECTS REGISTER SENDER 2 WHEN SET AND REGISTER SENDER 1 WHEN RESET AS A SINK
RST MEM REQ RESETS A MEMORY REQUEST FROM THIRD PARTY
RWD =RESET WATCHDOG TIMER
SC(R) =RESET SHIFT COUNTER
SC-DSO =SHIFT COUNTER AS A DATA SOURCE
SET L2 SET LEVEL 2
SG-DSO =SENSE GROUP AS A DATA SOURCE
SKIP ON SANG =A LESS THAN OR EQUAL TO EA. SANG
SMP =SHIFT AND MARK POSITION INSTRUCTION
SREJECT =STORED REJECT INDICATING A REJECTION OF AN ARITHMETIC PROCESS DURING DIV.
START START THE TIMING GENERATOR
STP CLK STOP THE TIMING GENERATOR
STR =SHIFT RIGHT GATING
SW TO STDBY RT =SWITCH TO STANDBY REAL TIME CLOCK
S(0-14)-DSO =REGISTER S BITS 0 THRU 14 AS A DATA SOURCE
TID TRANSFER INSTRUCTION FIELD TO DATA FIELD
TOVF =TEMPORARY OVERFLOW OF PARTIAL PRODUCTS DURING MULTIPLICATION.
TP DSTROBE DATA STROBE TO THIRD PARTY
TST CPD A MAINTENANCE SIGNAL THAT ALLOWS A CHECK FOR A LATENT FAULT ON THE INPUT TO THE CPD DECODE CIRCUIT
WMPB STORED SIGNAL TO WRITE MEMORY PROTECT BIT
XHQ INDICATION THAT AN INDEX IS BEING PROCESSED
ZELO1 =TP TRAP+ERR TRAP

EQUATIONS

ACKN =CCA·IR14·C2·L3+STC·C2·L1
ADA =STL'·A-DSK'(C2·L3(P3+P4+P5)·MUL)'·(C1·L3·IR12(SFTA+SFTL))'
ADDIN1 =XAM+CSA+ANA+ORA+ERA+DIV+ADD+SUB
ADDIN2 =ADD+SUB+DIV+CSA+SMP+MUL+SMNT+SMNZ
ADD1 (S) =C2·L3·P4·DIV·SC31·SREJECT'
ADD1 (R) =L4·P4·PC−ASO+CLR
ADS 1A (0−15) =(C2·L3)'(C2·L1(RPA+SAM))'(RTR·L2)'
ADS 1B (16−23) =(C2·L3)'(C2·L1(RPA+XAM))'(RTR·L2)'·XH'
ADX IN1 =CSX+ADX+SBX+IBP+IBN+INDEX+IR23+MRI (LPR+HLT)'
ADZL =AD12'·AD13'·AD14'·AD15'·AD16'·AD17'·AD18'·AD19'·AD20'·AD21'·AD22'·AD23'
ADZR =AD0'·AD1'·AD2'·AD3'·AD4'·AD5'·AD6'·AD7'·AD8'·AD9'·AD10'·AD11'
AOIN =SFTA·IR14'·IR13·Q23+SFTL−IR14'·IR13'·Q23+SMP·Q23+DIV·Q23+CCA·A23
AND =(SMNT+SMNZ+ANA+ORA)C2+SAMQ·C2·L3+HWS·LR13'+SSNT+HWL·IR14'
ARITH =EXO'·AND'
A-DSK =CCA·C2+MUL·C1+(DIV+XAM)C2·L4+LDA+PRA+LSGA+RTR+CPD TST
A-DSO =(RTR(L2·IR6+L3·IR0·IR13)+L2(HWL+HWS)+(C1·L4)(ADM+SANE+SANG+SAMQ)+L2·P5'·BZA+C2·L1'(ANA+ORA+ERA)+C3(L2+L3)DIV+C2·CCA·IR14'·IR13·IR12+C2·L2(SMNT+SMNZ)+L3(PAR+STA)+C2·L1')ADD+SUB)+(L3+L4)(ADI+SBI)+C2(L2+L3)(MUL+DIV)+(C2·L3·XAM))(CLK+BP)
A(0−5)-DSO =A−DSO+A(15)−DSO+A(12)−DSO+A(8)−DSO+A(6)=DSO
A(6−7)-DSO =A−DSO+A(15)−DSO+A(12)−DSO+A(8)−DSO
A(8−11)-DSO =A−DSO+A(15)−DSO+A(12)−DSO
A(12−14)-DSO =A−DSO+A(15)−DSO
A(15−23)-DSO =A−DSO
A23IN =SFTL·Q0·IR14'·IR13'+SFTA·A23·IR14'·IR13'+MUL(MADD·TOVF+MADD'·A23)+SFTA·IR12·IR13·IR14'·A23
BCHI (R) =PC−ALO·L4·P5+CLR
BCHI (S) =L2·P3(OVF·BAO+DBZ·BZA+A23·BNA·A23'·BPA+DBZ·BZX+DB14'·BPX+DB14·BNX)+L2·P5·IBP·AD14'+L2·P5·IBN·AD14
BDIS =CLK'·LDPC'·TP POWER ON (DMEME+ENMEME)'
BRH (S) =BRR·L1
BRH (R) =L1·Pr+CLR
BRS =BRR(L2+L3)
C STROBE =CPD·L3
CAR (S) =L4·P3·CAR24(ADD·C2+SUB·C2+ADI+SBI)+L3·P3·BRR·AD19
CAR (R) =L4·P3·CAR24'(ADD·C2+SUB·C2+ADI+SBI)+CLR
CCX-DSO =(CLK+DBPB)(CCA·C2·IR14+STC(L3+L4)C1)+BDIS·CCXPB
BCHI,TOVF,L1(P3+P4+P5)+L2,L2·P5+L3,L2+L3,L1·P5+L2+L3·P1,L1+L2,L3(P4+P5)+L4,P3+P4+P5. ALSO SETS TIMING GENERATOR TO C3·L4·P5·& IS SENT TO THE CMC
IEPE,DEPE,INVOP,P7 ERR,DIVZ,ERR TRP STORED.
CLRY =(IBN+IBP)L1·P5+DIV·C3·L1·P3
CLR =TP CLR+M CLEAR·TP POWER
CO =DIV(ADDI·C3+SC=0'·C2+C2(A23'·Y23+A23·Y23'+MUL·C2(01·SC27'+Q0·SC27)+IBP+IBN+CSX+HWS+SBI+SBX+C2(AOM+CSA+SUB+SMP+SANE+SANG)
COUNT PC =HWS·ADZR'·IR12·L3·P4+L2·P4·ADZ'·SSNT+C2·L2·P4·ADZ'(SMNT+SMNZ)+C2·L2·P4·BSP+EXPB'·PCINH'·C1·L1·P3·HWS·IR12'·ADZL'·L3·P4+CLK'(DISMEM READ+ENMEM WRITE)+ADZ'·SANE·C2·L2·P4+C2·L2·P4·SKIP ON SANG
COUNT SC =C1·L3·P2(CCA+SFTA+SFTL)+C2·L3·P2(DIV+MUL)
CRS1 (S) =CPD CP·DBN (BIT 0 IN CCPA BIT 2 IN CCPB)
CRSL (R) =CPS CP·DBN (BIT 1 IN CCPA BIT 3 IN CCPB)
CRS2 (S) =CPB CP·DB 4 (IN CCPA; DB 6 IN CCPB)
CRS2 (R) =CPB CP·DB 5 (IN CCPA; DB 7 IN CCPB
C13INST =ADI+SBI+RTR+MSI+HWL+SEL+SSNT+RTN+BUN BAO+BZA+BNA+BPA+BRR+ADX+SBX+CAX+CSX+BPX+BNX+BZX+LSQA+CPD+LPR+HLT
C14INST =STA+STQ+PAR+HWS+IBP+IBN+STX+SFTL+SFTA·IR14'
C23INST =ADD+SUB+CCA+SMP+LDA+ANA+ORA+ERA+LDC+LDQ+CSA+BSP+SMNT+SMNZ+SANE+SANG+SMNN+PRA
C24INST =STC+ADM+AOM+MUL+SOM+XAM+RPA+SAMQ
DBZ =OUTPUT OF DATA BUS EQUAL ALL ZEROS
DB 0 =IRO·IR(0−5)−DSO+SO·S(0−14)−DSO+AO·A(0−5)−DSO+Q0·Q(0−22)−DSO+DBO·LATCH DB+DRP70·MDR−DSO+SCO+SC−DSO+SLO·SG−DSO+RS1DATA 0(1)·RS1A−DSO+RS2DATA 0(1)·RS2A−DSO+RS1DATA 0(2)·RS1B−DSO+RS2DATA 0(2)·RS2B−DSO+PC(0)·PC−DSO+X1(0)·X1−DSO+X2(0)·X2−DSO+X3(0)·X3−DSO+LPC(0)·LPC−DSO+CXBO(1A)·CCX−DSO+DSRO(2A)·DS−DSO+DIAG(0)·DIAG−DSO+RTR·L3·IR0·IR13
DEPE (S) =C2·L1·P4·EP·(CCA·IR14+PRA+MDR−DSO+C1·L3·P4·EP·STC
DEPE (R) =REI+CLR
DIAG-DSO =BDIS·DIAGPB+TP DIAG−DSO(C1·L1·P5'

Continued

| | |
|---|---|
| | ·XH' IR23ST'+CLK')+(CLK+DBPB)(RTR ·L2·IR5) |
| DIVZ (S) | =C2·L1·P3·DIV·DBZ |
| DIVZ (R) | =REI+CLR |
| DOVF | =AD23'·A23'·ADZ'+ADZ'+AD23'·A23'(Y23' +QZ')+A23·AD23+A23·Y23·ADZ·QZ |
| DSTROBE | =C2·L3(CCA·IR14'+LDC) |
| DS-DSO | =CLK'·TP POWER ON (DSPR+LDPC +EMEME)+(C1·L1·P5'·XH'·IR23ST'+CLK') (EXPB·TP POWER ON) |
| ENWD | =MIS·L2·P3·IR11 |
| ERROR TRAP ST(S) | =C3·L4·TP TRAP' (ERROR TRAP ST)'(MRTO +7 ERR+IEPE+DEPE+DIVZ+INVOP)(P5 (CLOCKED)) |
| ERROR TRAP ST(R) | =REI+CLR |
| EVEN PARITY TEST (S) | =MIS·L2·P3·IR7 |
| EVEN PARITY TEST (R) | =MIS·L2·P3·IR8+CLR |
| EXO | =C2(ORA+ERA)+C2·L1·SAMQ+L3·BRR +HWS·IR14'·IR13+C2·L1'(ANA+ORA +ERA)+C2·L3·XAM+RTR·L3·P3·IR6(IR12 +IR13)+RTR·L4·P3·IR0+HWL·IR13 |
| IA-ASO | =PC−ASO·INTS·TA−ASO' |
| IEPE (S) | =C1·L1·P3·EP(EXPB+XH)' |
| IEPE (R) | =REI+CLR |
| INDEX | =(IR22+IR21)(IR19'+IR20·LPR'·HLT') |
| INHIBIT | =TA−ASO+TPINHIBIT OP+IR23+XH |
| INTIN | =DISABLES INTERRUPTS |
| INTIN (S) | =MIS·L2·P2·IR0 |
| INTIN (R) | =MIS·L2·P3·IR1+CLR |
| INTS (S) Q | =INT·CYCLE·INTBK·L2·P5(BSP+ACTIVE1 +SEL+EN1+LPR)' |
| INTS (R) | =C1·L1·P1+CLR |
| INT·CYCLE | =C14INST+C13INST+C2(C24INST +C23INST) |
| INVERT | =MUL·C2(Q1·SC27'+Q0·SC27)+CSX+SBX +SBI+HWS·IR13'·IR14'+C2(CSA+SUB +SMNT+SOM+SANE+SANG) |
| INV | =INVERT |
| INOP (S) | =C1·L4·P3 |
| INOP (R) | =L4·P4·IR23'(PC−ASO+XEC)+CLR |
| INVOP (S) | =C1·L2·P3·IOP·INHIBIT' |
| INVOP (R) | =REI+CLR |
| INX (S) | =C1·L4·P3·XINST |
| INX (R) | =L4·P4·IR23'(PC−ASO+XEC)+CLR |
| IRO(S) | =LOAD IR(0-14 AND BIT 23)DB O·CLR' |
| IRO(R) | =LOAD IR(0-14 AND BIT 23)(1A)·DB O' +CLR |
| IR-DSO | =C1·L2(ADI+SBI+BUN+BRR+HLT+RTN +LPR+CCA+SFTA+SFTL)+IR12(1C)(L3 +L4)(HWL+HWS)+CPD+SEL)L1'+(L2·P5 +L3)(BPX+BNX+BZX+BPA+BAO+BNA +BZA)+L4(1A)(CAX+IBP+IBN) |
| IR(0-5)-DSO | =IR−DSO(CLK+DBPB)+(BDIS·IRPB+TP−IR −DSO)+C1'(L2+L3)C2(1B)·SMP·(CLK +DBPB) |
| IR(6-14)-DSO | =IR−DSO(CLK+DBPB)+(BDIS·IRPB+TP−IR −DSO) |
| IR(15-23)-DSO | =(BDIS·IRPB+TP−IR−DSO) |
| IRL-DSO | =(CLK+DBPB)IR12'(L3+L4)(HWL+HWS) |
| IS SYNC | =P3(L2·SSNT)'·L4' |
| GPC-ASO | =PC−ASO(INTS+TA−ASO)' |
| LATCH AB (S) | =C1·L4·P3(ADM+AOM+XAM+RPA+SOM) |
| LATCH AB (R) | =MMDLL+CLR |
| LATCH DB | =C2(L1(P3+P4+P5)+L2)(ADM+AOM+SANG +SOM+SANE+PRA)+LDC·C2 |
| LBF | =LPR·LR13 |
| LDA 54 | =IR20·IR19'·IR18·IR17·IR16'·IR15' ·INHIBIT' |
| LDC 74 | =IR20·IR19·IR18·IR17·IR16'·IR15' ·INHIBIT' |
| LDF | =LPR·IR12 |
| LOAD A (0-5) | =LOAD A+LOAD AR+LOAD A6+LOAD A8 |
| LOAD A (6-7) | =LOAD A+LOAD AR+LOAD A8 |
| LOAD A (8-11) | =LOAD A+LOAD AR |
| LOAD A (12-13) | =LOAD A+LOAD AL |
| LOAD A | = DIV·C2·L2·P5·SC30'·REJECT' +(ADI +SBI)L4·P4+ADDIN·C2·L4·P4 |

Continued

| | |
|---|---|
| | +C1·L3·P3(CCA+SFTA+SFTL·IR14'+CPD TST+C3·L3·P4·DIV+LSGA·L2·P3 +CCA·C2·L2·P3·IR12·IR13·IR14+MUL ·C2·L3·P4+MUL·C2L2·P5(MODE·Q0' +MODE'·Q0)+MUL·C1·L4·P3+DIV·C2 ·L3·P4·SC30'·SC31'+C2·L1·P3(DIV +LDA+PRA) |
| LOAD AL | HWL·L4·P3, IR12' |
| LOAD AR | = L4·P3·IR12·HWL+C2·L2·P3·CCA·IR14 ·IR13·IR12' |
| LOAD IR (0-14 AND BIT 23)(1A) | (ACTUALLY LOADS BITS 0 THRU 11) =C1·L1−P3+TP LOAD IR |
| LOAD IR (0-14 AND BIT 23)(1B) | (ACTUALLY LOADS BITS 12 THRU 14 =C1·L1·P3(EXT OP PROTECT)'+TP LOAD IR |
| LOAD IR (15-20) | =C1·L1·P3·INOP'+TP LOAD IR |
| LOAD IR (21-22) | =C1·L1·P3·INX'+TP LOAD IR |
| LOAD LPC | =C1·L2·P2·(CLR+C1·L3·IR23')(ZEL01') ·INHIBIT LOAD LPC+LOAD LPC DDT |
| LOAD PC | =BCHI·P1·TCP(L3·IR18·ZEL01'+L4(IBP +IBN)+C2·L1·P4·BSP+CLK'·LDPCL ·TP POWER ON+L2·P3(BRR+BUN+HLT +RTN)+TP LOAD PC |
| LOAD S | =RTR·L2·P3+(RPA+XAM+SAMQ)C2·L1 ·P3+SMP·C2·L3·P3+ADX IN1·C1·L2 ·P5+(AOM+ADM+SOM)C2·P4 +DIV·C2·L2·REJECT'·SC30 +C2·L3·P4·SREJECT·SC31 |
| LOAD SC | L2·PE(CCA+SFTA+SFTL) |
| LOAD Q | =RTR·L3·P3·IR7(IR12+IR13)+RTR·L4 ·P3·IR1+(SFTA·IR13+SFTL·IR13')C1 ·L3·Pe+LDQ·C2·L1·P3+DIV·C2·L1·P3 +DIV·C3·L1·P3 +DIV·C2·L3·P4·SC30'·SC31' +MUL·C2·L3·P2 |
| LOAD XL | =RTR·L3·P2·IR8·IR12·IR13+RTR·L4·P3 ·IR2+X1(L4·P3(ADX+SBX+CAX+CSX) +L3·P4(IBP+IBN)+C2·L4·P3·SMP) |
| LOAD X2 | =RTR·L3·P2·IR9·IR12·IR13+RTR·L4·P3 ·IR3+X2(L4·P3(ADX+SBX+CAX+CSX) +L3·P4(IBP−IBN)+C2·L4·P3, SMP) |
| LOAD X3 | =RTR·L3·P2·IR10, IR12·IR13+RTR·L4·P3 ·IR4+X3(L4·P3(ADX+SBX+CAX+CSX) +L3·P4(IBP+IBN)+C2·L4·P3·SMP) |
| LOAD Y | =C1·L1·P3+SAMQ·C2·L2·P3+ADDIN2·C2 ·L1·P3+(ANA+ORA+ERA)C2·L1·P3 +(ADI+SBI+HWL+HWS)C1·L2·P3 +(ADM+AOM+SAMQ+SOM+SANG +SANE)C1·L4·P3 |
| LPC-DSO | =(CLK+DBPB)(L3+L4)C1·BSP |
| MADD (S) | =C2·L2·P3·MUL |
| MADD (R) | =L3·P5·MUL+CLR |
| MDR-DSO | =(CLK+DBPB)(C1·L1·P5'(EXPB+XH)' +C2·L1·P5'(C2·MDR=DSO INHIBIT)' (+TPMDR=DSO+BDIS·MDPB |
| MMDLL (S) | =DLP7·CLR'·MMWRITE |
| MMDLL (R) | =DLP7'(CLR+MMWRITE') |
| MMREAD (S) | =(C3·L4+C1(L3+L4)C13INST+C1(L3 +L4)MRI·PRA'+C2(L3+L4)C23 INST +C1·L4·C14 INST+C2·L4·C24 INST) (PC-ASO·BCHI'+P3·BCHI+S-ASO) (EXCTP')CLK |
| MMREAD (R) | =DAP7·CLK'+DAP7·L1·P2·CLK+CLR |
| MMWRITE | =MMDLL'(C2·L3(ADM+AOM+XAM+RPA +SOM)+C1·L3(STX+STA+STQ)+C1(L3 +L4)BSP+ |
| MODE (J) | =MUL·C2·L3·Q1·Q0· |
| (K) | =MUL·C2·L3(Q1'+Q0') |
| (C) | =P3 |
| (S)' | =MODE' |
| (R)' | =MUL·C1·L4·P3 |
| MRI | =STX+IR20+IR23 |
| OVF (S) | =SBI·L4·P3(A23·Y23'·AD23'+A23'·Y23 ·AD23)+ADI·L4·P3(A23'·Y23'·AD23+ A23·Y23·AD23')+SUB·C2·L4 ·P3(A23·Y23'·AD23'+A23'·Y23·AD23) |
| OVF (S) | =ADD·C2·L4·P3(A23'·Y23'·AD23+A23 ·Y23·AD23')+DIV(C2·L1·P2(A23·A22' +A23'·A22)+C1·L3·P3·IR14'·IR12' ·SFTA+C2·L2·P5·DIV·SCO·DOVF +BRR·L3·P3·AD20 |
| OVF (R) | =BAO·L4·P3+CLR |
| PCINH (S) | =L4·P4(IR23+XH+XEC+IA−ASO+TA −ASO) |
| PCINH (R) | =L4·P2 PC−ASO |
| PC−ASO | =(DMEME+ENMEME+PCPB)TP POWER |

Continued

| | |
|---|---|
| | ON·CLK'+((CLK+ABPB+TP AB)(C3·L4 +C13INST·C1(L3+L4)+C23INST·C2(L3 +L4)+C14INST·C14INST·C1·L4 +C24INST·C2·L4)+(CLK')(TP ENTER MEM+TP DIS MEM) |
| PBRM (S) | =MMREAD·DRP7 25·C2·L1·P2 |
| PBRM (R) | =MMREAD·DRP7 25'·C2·L1·P2 |
| PC-DSO | =RTR·L2·IR11+TP PC-DSO |
| P7 ERR | =PORT 7 ERROR CCP'S PORT IN MEMORY CONTROL |
| P7 ERR (S) | =PEP7 |
| P7 ERR (R) | =MIS·IR4+CLR |
| QO(S) | =DIV·C2·L2·P5·REJECT'·SC30' |
| Q-DSK | =LDQ+C3·L1·DIV+RTR |
| | =(CLK+DBPB)(RTR·L2·IR7+RTR·L3 ·IR1·IR13+DIV·C2·L4+STQ·L3+SAMQ ·C2·L2)+BDIS·TP POWER ON'QPB+TP Q-DSO |
| Q(0-22)-DSO | =Q-DSO+Q22-DSO |
| Q22-DSO | =DIV·C1·L4(CLK+DBPB) |
| Q(23)-DSO | =Q-DSO |
| Q0IN | =SFTL·A23·IR12'·IR13'·IR14' |
| Q23IN | =A0·(IR14·SFTL)' |
| QZ | INDICATES THAT RQ(0-22) IS ZERO |
| QZ( ) | =C1·L4·P4·DIV·DBZ |
| QZ(R) | =C1·L4·P2·DIV+CLR |
| REI | =MIS·L2·IR4 |
| RS1B-DSO | =RSSEL'·CRS1'·PRA-C2·L1 |
| RS1A-DSO | =RSSEL'·CRS1·PRA·C2·L1 |
| RS2A-DSO | =RSSEL·CRS2·PRA·C2·L1 |
| RS2B-DSO | =RSSEL·CRS2'·PRA·C2·L1 |
| RSSEL (S) | =L3·P3·AB12(PAR+PRA) |
| RSSEL (R) | =L4·P4·PC-ASO+CLR |
| RST ERR WD | =MIS·L2·IR14 (WATCHDOG TIMER) |
| RSREAD | =PRA·C1·L4(S12+S12')(S12=RS2; S12'=RS1) |
| RSWRITE | =PAR·L3-P1'(S12+S12') (S12=RS2; S12'=RS1) |
| RST MEM REQ | =C1·L2·CCP ON LINE |
| RST WD | (WDCNT1+WDCNT2+WDCNT3)RST ERR WD+RWD |
| RWD | =MIS·L2·P3·IR12 |
| SCAN (S) | =L1·P1 |
| SCAN (R) | =L4·P4·INTS'·ZEL01' |
| SC(R) | =CLR+L4·P3·PC-ASO |
| SC-DSO | =(CLK+DBPB)C2·L1·SMP+BDIS·SCPB |
| SG-DSO | =BDIS·SGPB+(CLK+DBPB)(LSGA +SSNT)L2 |
| SMP | =SFTA·IR14 |
| SREJECT (S) | =DIV·C2(SC30·DBZ+SC30·ADX'·Q23'·A23·Y23·SC=0 +A23'·Y23'·SC=0+Y23'·AD23(SCO+SC30)' +Y23·AD23'(SCO+SC30)'L3·P2 |
| SREJECT (R) | =DIV·C2·L2·P2+CLR |
| SSTROBE1 | =SEL·L2(P4+P5) |
| SSTROBE2 | =SEL·L3(P4+P5) |
| START | TP POWER ON(RUN+INC+STEP+EXPB) +TP INC+TP STEP+TP RUN |
| STL | =CCA·C1·L3+C1·L3(SFTA+SFTL)·IR12' +DIV·C2·L1+DIV·C2·L3(P3+P4+P5)SC31' |
| STP CLK | =P3(INC+TP INC)+P3·PC-ASO·L4·((TP POWER ON)(STEP+ADDRESS MATCH+ EXPB)+HLT+TP STEP) |
| STR | =MUL·C2·L3(P3+P4+P5)+C1·L3·IR12 (SFTA+SFTL) |
| SW TO STDBY RT (S) | =MIS·L2·P3·IR9 |
| SW TO STDBY RT (R) | =MIS·L2·P3·IR10+CLR |
| S-ASO | =(CLK+ABPB+TP AB)(MMDLL')(C1(L3+L4) MRI+C1(L3+L4)BSP+C1·L3(PAR+STA+ STX+STQ)+C1·(L3+L4)(PAR+STC)) |
| S-DSK | =(C2·L3)+(C2·L1(RPA+XAM))+(RTR·L2) |
| S(0-14)-DSO | =(CLK+DBPB)(XH·C1·L1·P5')+IBP+IBN) L3·P1'+C2·L3(ADM+AOM+SOM+SAMQ) +L4(CSX+RTR)+C2·BSP+DIV·C3·L1+C2· L4(XAM+SMP)+L4(ADX+SBX)) |
| S(15-23)-DSO | =S(0-14)-DSO+RPA·C2·L3 |
| TA-ASO | =C3·ZEL01 |
| TID | =LPR·IR14 |
| TOVF (S) | =MUL(INV·A23·Y23·C24'+INV·A23·Y23·C24 +INV'·A23'·Y23·C24'+INV'·A23·Y23'·C24' +INV·A23·Y23'·C24+INV·A23'·Y23'·C24')· C2·L2·P5·MUL |
| TOVF (R) | =MUL·L3·P5+CLR |

Continued

| | |
|---|---|
| TP CPD | =IR-DSO·CPD |
| TP DSTROBE | =(CCA·IR14'+LDC)(C2·L1(P3+P4+P5)·CCP ON LINE) |
| TP TRAP DISF (S) | =DB0(CPD TRAP(CLOCKED)) |
| TP TRAP DISF (R) | =DB1(CPD TRAP(CLOCKED))+CLR |
| TST CPD (S) | =MIS·L2·IR2 |
| TST CPD (R) | =MIS·L2·IR3+CLR |
| WAIT (R) | =MIS·L2·IR13 |
| WMPB (S) | =MIS·L2·IR5 |
| WMPB(R) | =MIS·L2·IR6+CLR |
| XH (J) | =C1·L4·INDEX·(IR20+IR23)'· |
| (K) | =C1·L4 |
| (C) | =P4·TCP |
| (S)' | =XH' |
| (R)' | =CLR+L4·P4·PC-ASO |
| XINST | =IR20'·IR19 +C2·L1·P3·SMNN·DB23'+C2·L3·P4·ADZ'· SAMQ |
| X1 | =IR21·IR22' |
| X1-DSO | =RTR(L2·IR8+L3·IR2·IR13) +X1(STX·L3+L2·P5'(BPX+BNX+BZX) +C1(L1·P5+L2+L3·P1)(INDEX+ADX+SBX+ IBP+IBN)) |
| X2 | =IR21'·IR22 |
| X2-DSO | RTR(L2·IR9+L3·IR3·IR13) +X2(STX·L3+L2·P5'(BPX+BNX+BZX) +C1(L1·P5+L2+L3·P1)(INDEX+ADX+SBX+ IBP;IBN)) |
| X3 | =IR21·IR22 |
| X3-DSO | =RTR(L2·IR10·L3·IR4·IR13) +X3(STX·L3+L2·P5'(BPX+BNX+BZX) +C1(L1·P5+L2+L3·P1)(INDEX+ADX+SBX+ IBP+IBN)) |

ADM (Add to Memory) Operation

Figure 16:
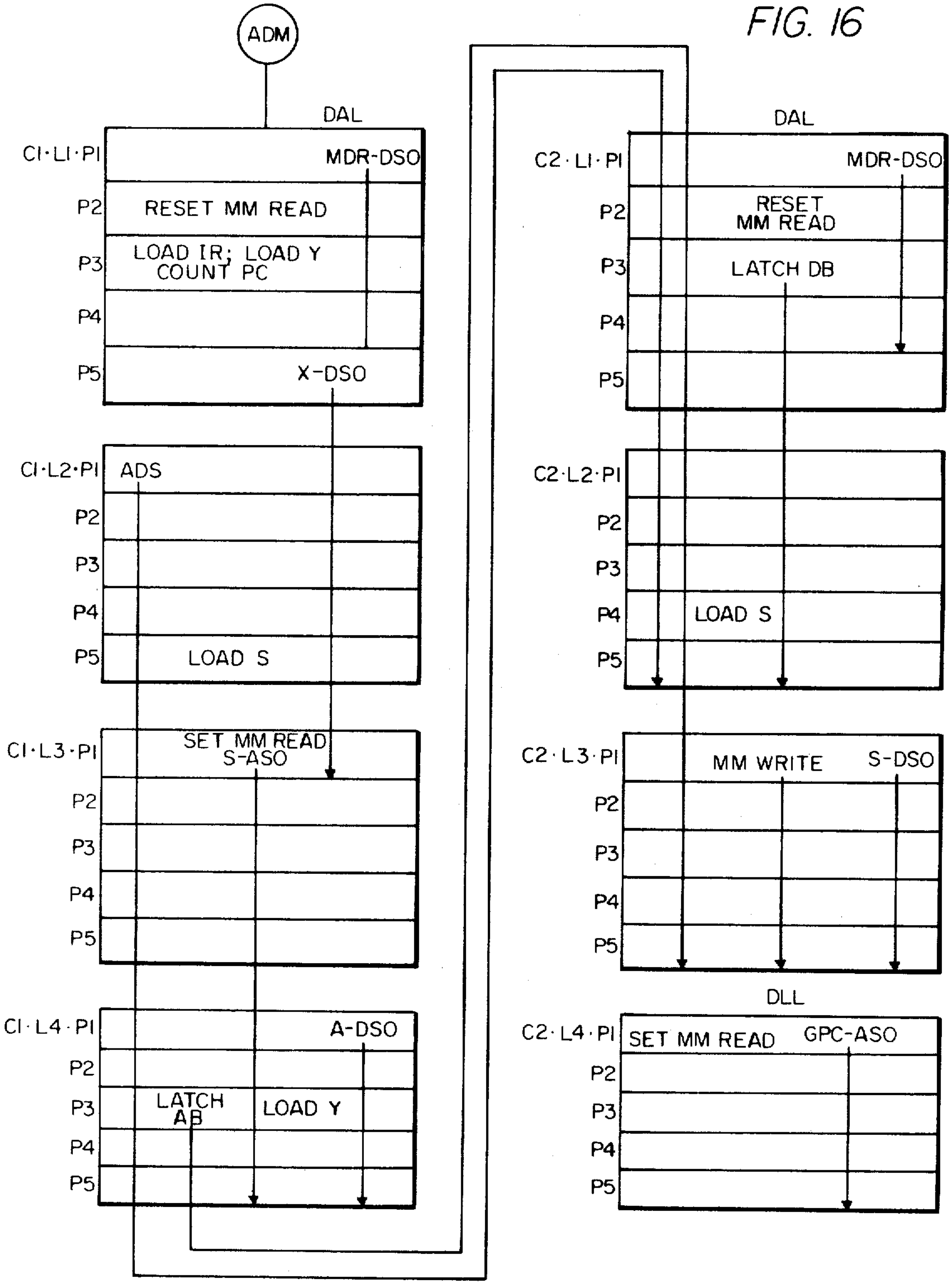
FIG. 16 is a timing diagram for the instruction ADM (add to memory).

To illustrate latching of the buses, the operation for an ADM instruction will be described. The timing chart is FIG. 16. An octal representation is used in the following description for all data and addresses in the registers and on the buses.

Assume initially that toward the end of the preceding instruction PC-ASO and therefore GPC-ASO become true along with MM read. The program counter PC (FIG. 14) contains some address, for example (13257), which is gated onto the address bus AB (FIG. 9).

During the last cycle, which may be any one of C1, C2 or C3 depending on the instruction, the signal GO from gate 422 becomes false. Therefore at P4, L4, input K of flip-flop SYNC becomes true. The next clock pulse advances the pulse counter to P5 and also resets SYNC. This blocks further pulses from lead TCP and thus prevents the timing generator from advancing further.

In the meantime the memory control circuit causes the data word to be read from the main memory and placed in a data register having outputs on the cable leads DRP7-$\phi$ to 23. A signal DAP7 becomes true indicating data available at port 7.

the signal GOC1 becomes true in response to the condition (DAP7·PC-ASO·ZELO1'). The element ZELO1 relates to a trap condition and is normally false. GOC1 via gate 422 along with CLK makes the J input of SYNC true so that the next clock pulse sets it. When SYNC-B from the duplicate processor is also true, gate 414 is enabled to supply pulses to lead TCP. The next clock pulse then sets the timing to C1·L1·P1. The signal PC-ASO becomes false as the timing is set to L1.

To use the memory data register as a data source, the signal MDR-DSO becomes true in response to the signal condition [C1·L1·P5'(EXPB + XH)'CLK]. The data from leads DRP7–ϕ to 23 is then gated onto the data bus (FIG. 6) during pulses P1–P4 of cycle C1 level L1.

During the second pulse MM READ is reset in response to DAP7·L1·P2·CLK.

During the third pulse the condition (C1·L1·P3) is used to LOAD IR, LOAD Y and COUNT PC. In the equation for COUNT PC, EXPB and PCINH will usually be false. (The signal PCINH may be true in certain instances in which the program counter has already been advanced with indirect addressing indexing, an interrupt or a trap and should not be advanced again.)

The situation now is that the program counter has advanced to (1326ϕ), and the contents of the word at address (13257) have been placed via the data bus into registers IR and Y. Assume this word to be (14621372). The (1) corresponding to bits 23, 22, 21 indicates indexing with register X1, the (46) is the OP code for ADM and (21372) is the operand address.

INDEX is true in response to (IR21·IR19'). During the fifth pulse MDR–DSO becomes false, and index register X1 becomes the data bus, source by X1 - DSO = (X1·C1·L1·P5·INDEX), where X1 = (IR22'·IR21). The signal ADS is normally true during cycle C1 unless RTR is true.

As shown in FIG. 11, the input for register S is normally from the adder of FIG. 12, via AND logic 1160 enabled by signal ADS which is normally true except when S–DSK is true. The signal LOAD S is true with (ADX IN1·C1·L2·P5) where ADX IN1 is true with INDEX true. LOAD S causes register S to be loaded with the output of the adder, which is the sum of the operand address instruction which has been loaded into register Y and the contents of register X1 which appears on the data bus. Assuming for example a value (ϕϕϕ12) from the index register, the address in register S is now (21404).

On the first pulses of the thid leve., MMREAD latch is set on (C1·L3·MRI·PRA'); where MRI is true with bit IR20 true, this bit being true for the ADM code OP46. The signal S–ASO is also true with (CLK·MMDLL'·C1·L3·MRI). The main memory is now accessed via memory control CMC to read the data from the word at address (21404). In the meantime the processor continues other operations.

During level 14 the signal A–DSO becomes true with C1·L4·ADM. During pulse P3 the signal LOAD Y is true with (ADM·C1·L4·P3), and LATCH AB is also set on the same condition. Therefore data from register A via the data bus is placed in register Y, and the address from register S is latched on the address bus. Assume data from A into Y is (ϕϕϕϕϕ132).

It is now necessary to wait for the data to be available from the main memory, indicated by the signal DAP7. ADM is a C24 instruction so GOC2 becomes true on the condition C1·L4·C24INST·DAP7. This initiates the cycle C2.

The signal MDR-DSO becomes true on C2·L1·P5'(C2,MDR–DSO Inhibit)'CLK, which gates the data from the memory onto the data bus. Assume data is (23512562).

The latch MMREAD is reset on (DAP7·L1·C2·CLK).

The signal LATCH DB becomes true on (ADM·C2[L1(P3 + P4 + P5) + L2]) so that the data from memory is latched on the data bus during the last three pulses of level L1 and all of level L2.

During pulse P4 of level L2, LOAD S becomes true on ADM·C2·L2·P4. therefore the sum from the adder is placed in register S. This sum is (ϕϕϕϕϕ132) + (23512562) = (23512724).

During level L3 the signal S–DSO is true on (C2·L3·ADM); and MMWRITE is true on (C2·L3·ADM·MMDLL'·LATCH AB). This signal along with LATCH AB remains true during all of level L3. Therefore a command is given to memory control to write the data from register S at the address of the data word which is latched on the address bus.

The timing stops at C2·L3·P5 while awaiting a signal from the memory control that the data is loaded in memory. This is accomplished by the signal WAIT STATE on the condition (C2·MMDLL'·ADM).

The latch MMDLL is set in response to the signal DLP7 from memory control indicating data loaded at port 7. LATCH AB is reset in response to MMDLL. With MMDLL true, WAIT STATE becomes false and makes GO from gate 422 true. Flip-flop SYNC sets on the next clock pulse, and along with SYNC-B enables gate 414 to provide clock pulses on lead TCP and advance the timing to level L4. MMWRITE becomes false and the latch MMDLL is reset (DLP7 becomes false to remove the set signal). The signal S–DSO becomes false when the level goes to L4.

The last level of the cycle is used to initiate reading the next instruction, whose address is in the program counter, now at 13260. MMREAD sets and PC–ASO becomes true on (C2·L4·C24INST), and GPC–ASO then becomes true. The timing stops at C2·L4·P5 while waiting for the data available signal DAP7.

OTHER INSTRUCTIONS WITH BUS LATCHING

As seen in the equations for LATCH AB(S) and LATCH DB, the instructions AOM for add one to memory and SOM for subtract one from memory, use latching of both the address bus and the data bus; the instructions XAM for exchange contents of register A and memory, and RPA for replace address, use address bus latching; and the instructions SANG for skip an instruction if contents of register A is not greater than memory contents at the effective address, SANE for skip if contents of register A not equal to memory contents, and PRA for place contents of register-sender memory into register A, use data bus latching.

The operation for instructions AOM and SOM is very similar to ADM. Both omit A–DSO during C1·L4 so that the data bus has all zeros when register Y is loaded during C1·L4·P3. For AOM the carry into bit ϕ signal Cϕ is true on (C2·AOM), while for SOM a negative one is effectively added by INVERT = C2·SOM.

The instructions XAM and RPA use latching of the address bus to keep the address available while using the S register for other purposes.

The instructions SANG and SANE use latching of the data bus to retain information read from memory to do arithmetic operations (subtract contents of register A from the data read from memory) during cycle C2, levels L1 and L2.

What is claimed is:

1. A computer central processor in a digital processing system which comprises said processor, a memory, and other subsystems;

wherein said processor comprises a plurality of registers, each comprising a plurality of bistable devices for alternatively storing "ones" and "zeros," said registers including an arithmetic input register, an arithmetic output register, an accumulator register, and an instruction register, a data bus comprising a plurality of conductors, source gating means coupling a first set of said registers, data lines from other subsystems, and a set of data conductors from the memory to the data bus, sink gating means coupling the data bus to a second set of said registers, including the arithmetic output register and the accumulator register, the data bus being also coupled to the main memory and to other subsystems, certain ones of said registers being included in both said first set and said second set, an arithmetic logic unit, with arithmetic input gating means from the data bus and the arithmetic input register to the arithmetic logic unit, and arithmetic output gating means from the arithmetic logic unit to the arithmetic output register and the accumulator register, control logic means connected to supply control signals to selectively enable said gating means to transfer data to and from the data bus and into and out of the arithmetic logic unit, and to selectively enable said gating means to transfer instructions from the instruction register to said control logic means, timing means responsive to a source of clock pulses to supply a sequence of timing interval signals on a plurality of timing leads coupled to the control logic means;

wherein said source gating means includes a set comprising one data bus latching gate for each data bus conductor, each having an input from its data bus conductor and an output to the same conductor, and a latch data bus lead from said control logic means to all of the data bus latching gates so that responsive to a latch data bus enable signal condition on the latch data bus lead all "ones" on data bus conductors are latched;

means in said control logic means responsive to given instructions transferred from the instruction register to enable the source gating means to the data conductors from the memory to gate data from memory onto the data bus, to supply the latch data bus enable signal to independently retain the data on the data bus after removing said enable of the source gating means for the data conductors from the memory, so that the memory may be released while retaining the data for processing during subsequent timing intervals.

2. A computer central processor according to claim 1, further including an address bus comprising a plurality of address conductors, wherein one of said registers in a program counter, address source gating means coupling the program counter and the arithmetic output register to the address bus, means coupling the address bus to the memory, wherein said address source gating means includes a set comprising one address bus latching gate for each address bus conductor, each having an input from its address bus conductor and an output to the same conductor, and an latch address bus lead to all of the address latching gates so that responsive to a latch address bus enable signal condition on the latch address bus lead all "ones" on the address bus are latched;

means in said control logic means responsive to certain instructions transferred from the instruction register to enable the address source gating means from the arithmetic output register to gate address information from the arithmetic output register to the address bus, to supply the latch address bus enable signal to independently retain the address information on the address bus after removing said enable of the address source gating means, so that the arithmetic output register may be used for other functions while retaining the address information for processing during subsequent timing intervals.

3. A computer central processor according to claim 2, wherein an "add to memory" instruction is both one of said given instructions for data bus latching and one of said certain instructions for address bus latching, wherein there is included means to load the effective address for data into the arithmetic output register and then to gate it to the address bus, means to use this address from the address bus to read data from that address, and to latch the address bus, means for gating data from the accumulator register via the data bus to the arithmetic input register;

means for gating data from memory to the data bus which is then latched;

data means for gating data from the arithmetic input register and the data bus in the arithmetic logic unit and loading the result into the arithmetic output register;

means for supplying data via the data bus from the arithmetic output register and to supply the address from the address bus to the memory along with a write enable signal;

all of said operations being controlled by signals from said control logic means and said timing means.

4. A computer central processor according to claim 3, wherein there are instructions "add one to memory" and "subtract one from memory" which are also both given instructions for data bus latching and certain instructions for address bus latching; and means to execute these instructions which include the same means for data bus and address bus latching as used with the "add to memory" instruction.

5. A computer central processor according to claim 4, wherein said latch address bus lead is the output of a bistable device having set and reset inputs from the control logic means.

6. A computer central processor in a digital processing system which comprises said processor, a memory, and other subsystems;

wherein said processor comprises a plurality of registers, each comprising a plurality of bistable devices for alternatively storing "ones" and "zeros," said registers including an arithmetic input register, an arithmetic output register, an accumulator register, an instruction register, and a program counter;

an arithmetic logic unit, with arithmetic input gating means from the arithmetic input register to the arithmetic logic unit, and arithmetic output gating means from the arithmetic logic unit to the arithmetic output register and the accumulator register, an address bus comprising a plurality of address conductors;

address source gating means coupling the program counter and the arithmetic output register to the address bus;

means coupling the address bus to the memory;

control logic means to supply control signals to selectively enable said gating means to transfer information to the address bus and into and out of the arithmetic logic unit, and to selectively enable said gating means to transfer instructions from the instruction register to said control logic means, timing means responsive to a source of clock pulses to supply a sequence of timing interval signals on a plurality of timing leads coupled to the control logic means;

wherein said address source gating means includes a set comprising one address bus latching gate for each address bus conductor, each having an input from its address bus conductor and an output to the same conductor, and an latch address bus lead from said control logic means to all of the address bus latching gates so that responsive to a latch address bus enable signal condition on the latch address bus lead all "ones" on the address bus are latched;

means in said control logic means responsive to certain instructions transferred from the instruction register to enable the address source gating means from the arithmetic output register to gate address information from the arithmetic output register to the address bus, to supply the latch address bus enable signal to independently retain the address information on the address bus after removing said enable of the address source gating means, so that the arithmetic output register may be used for other functions while retaining the address information for processing during subsequent timing intervals.

7. A computer central processor according to claim 6, wherein said latch address bus lead is the output of a bistable device having set and reset inputs from the control logic means.

* * * * *

UNITED STATES PATENT OFFICE
CERTIFICATE OF CORRECTION

Patent No. 3,820,084 Dated June 25, 1974

Inventor(s) LEO V. JONES, PAUL J. KEEHN and PAUL A. ZELINSKI

It is certified that error appears in the above-identified patent and that said Letters Patent are hereby corrected as shown below:

Column 23, line 61, "in" should be -- is --;

Column 24, line 33, delete the first "data".

Signed and sealed this 5th day of November 1974.

(SEAL)
Attest:

McCOY M. GIBSON JR.
Attesting Officer

C. MARSHALL DANN
Commissioner of Patents